United States Patent
Fox et al.

(10) Patent No.: US 12,191,756 B2
(45) Date of Patent: Jan. 7, 2025

(54) POWER SUPPLY DEVICE WITH OVER-POWER PROTECTION

(71) Applicant: Lutron Technology Company LLC, Coopersburg, PA (US)

(72) Inventors: Ari L. Fox, Somerville, MA (US); Ananthanag Nemmani, Austin, TX (US); David C. Wu, Malden, MA (US)

(73) Assignee: Lutron Technology Company LLC, Coopersburg, PA (US)

( * ) Notice: Subject to any disclaimer, the term of this patent is extended or adjusted under 35 U.S.C. 154(b) by 128 days.

(21) Appl. No.: 17/866,213

(22) Filed: Jul. 15, 2022

(65) Prior Publication Data

US 2023/0017092 A1    Jan. 19, 2023

Related U.S. Application Data

(60) Provisional application No. 63/222,353, filed on Jul. 15, 2021.

(51) Int. Cl.
*H02M 1/00* (2007.01)
*H02M 1/08* (2006.01)
*H02M 1/32* (2007.01)
*H02M 3/335* (2006.01)

(52) U.S. Cl.
CPC .......... *H02M 1/32* (2013.01); *H02M 1/0009* (2021.05); *H02M 1/08* (2013.01); *H02M 3/33571* (2021.05)

(58) Field of Classification Search
CPC ..................... H02M 3/33507; H02M 1/08
See application file for complete search history.

(56) References Cited

U.S. PATENT DOCUMENTS

| | | |
|---|---|---|
| 6,347,028 B1 | 2/2002 | Hausman et al. |
| 8,466,628 B2 | 6/2013 | Shearer et al. |
| 8,629,624 B2 | 1/2014 | Chitta et al. |
| 9,232,574 B2 | 1/2016 | Veskovic |
| 9,247,608 B2 | 1/2016 | Chitta et al. |
| 9,485,813 B1 | 11/2016 | Lewis et al. |
| 10,362,656 B2 | 7/2019 | Moorthy et al. |
| 2014/0103724 A1 | 4/2014 | Wagoner |
| 2015/0333630 A1* | 11/2015 | Pastore ............. H02M 3/33515 363/21.17 |

(Continued)

FOREIGN PATENT DOCUMENTS

| | | | | |
|---|---|---|---|---|
| CA | 3108185 C | * | 11/2023 | ........ H02M 3/33523 |
| JP | 2009213246 A | | 9/2009 | |

*Primary Examiner* — Sisay G Tiku
(74) *Attorney, Agent, or Firm* — Flaster Greenberg P.C.

(57) ABSTRACT

A power supply may include a power converter circuit may be configured to control a magnitude of an output voltage, and generate a signal indicative of the magnitude of the output voltage. The power supply may include an over-power protection circuit that is configured to receive a feedback signal indicative of a magnitude of an input current of the power converter circuit. The power supply may include a control circuit that is configured to determine a magnitude of a requested power based on the signal indicative of the magnitude of the output voltage, and disable the power supply (e.g., control the magnitude of the output voltage to be zero volts) when the magnitude of the requested power is greater than a second threshold and the magnitude of input power indicated by the first feedback signal is less than a third threshold.

20 Claims, 6 Drawing Sheets

(56) References Cited

U.S. PATENT DOCUMENTS

| | | | | |
|---|---|---|---|---|
| 2015/0333764 A1* | 11/2015 | Pastore | .................. | H03M 1/68 |
| | | | | 341/145 |
| 2015/0380929 A1 | 12/2015 | Mitsutani | | |
| 2017/0311400 A1* | 10/2017 | Newman, Jr. | ........... | H02M 1/10 |
| 2018/0249543 A1* | 8/2018 | Kober | .................. | H05B 47/165 |
| 2020/0036320 A1 | 1/2020 | Hausman et al. | | |
| 2020/0037408 A1* | 1/2020 | DeJonge | ................ | H05B 45/39 |
| 2020/0366188 A1 | 11/2020 | Bollinger et al. | | |
| 2021/0120649 A1* | 4/2021 | DeJonge | ........... | H02M 3/33523 |
| 2021/0307142 A1* | 9/2021 | Bocock | ............... | H02M 1/4258 |
| 2022/0085610 A1 | 3/2022 | Dejonge et al. | | |
| 2022/0264723 A1* | 8/2022 | DeJonge | ................ | H05B 45/14 |
| 2023/0208284 A1* | 6/2023 | Wrathall | ............. | H02M 1/4225 |
| | | | | 323/282 |

\* cited by examiner

POWER SUPPLY DEVICE WITH OVER-POWER PROTECTION

CROSS-REFERENCE TO RELATED APPLICATIONS

This application claims priority to U.S. provisional patent application No. 63/222,353, filed Jul. 15, 2021, which is incorporated herein by reference in its entirety.

BACKGROUND

A power supply is a device or system that is capable of providing power to an electrical load typically by converting electrical energy from one form to another to make the energy compatible with the electrical load's requirements. For example, a power supply might convert 120 or 240 volt alternating current ("AC") energy to lower-voltage, regulated direct current ("DC") energy appropriate for use by the electrical load, such as a lighting load or a motor load. The power supply may be integrated with the electronic load, or may be a discrete component that is external to the electrical load.

Power supplies may include hardware based over-current protection circuits that detect when the amount of power provided by the power supply exceeds a predetermined threshold (e.g., a power threshold defined by the class of power supply, such as by a standards body like Underwriters Laboratories (UL)). As such, when the power supply outputs power that is in excess of the predetermined threshold, the over-current protection circuit of the power supply is configured to cause the power supply to shut down (e.g., reduce the output power to zero).

SUMMARY

Component failures may occur within a power supply, and as such, a power supply may include a redundant over-current protection scheme(s). For example, a power supply may be configured to supply an amount of power, for example, to an electrical load or a load control device. The power supply may include a regulator circuit, an over-power protection circuit, and a control circuit. The regulator circuit may be configured to control a magnitude of an output voltage to control the amount of power delivered from the power supply across a power range. The regulator circuit may be configured to generate a signal indicative of the magnitude of the output voltage. The over-power protection circuit may be configured to receive a feedback signal indicative of a magnitude of an input current of the regulator circuit. The control circuit may be configured to determine the input power based on the input current and a bus voltage of the control device. The over-power protection circuit may also be configured to disable the power supply (e.g., control the magnitude of the output voltage to be zero volts) in response to the magnitude of the input power indicated by the feedback signal exceeding a first threshold indicative of an over-power condition (e.g., a power in the range of 95-100 watts).

A power supply may be provided for controlling an amount of power delivered by the power supply. The power supply may include a power converter circuit, an over-power protection circuit, and/or a control circuit. The power converter circuit may be configured to control a magnitude of an output voltage. The power converter circuit may be configured to generate a first feedback signal indicative of a magnitude of an input current of the power converter circuit and a second feedback signal indicative of the magnitude of the output voltage. The over-power protection circuit may be configured to receive the first feedback signal indicative of a magnitude of the input current of the power converter circuit. The over-power protection circuit may be configured to control the magnitude of the output voltage to be approximately zero volts in response to the magnitude of the input current exceeding a first threshold indicative of an over-power condition. The control circuit may be configured to determine a magnitude of a requested power based on the second feedback signal indicative of the magnitude of the output voltage. The control circuit may be configured to control the magnitude of the output voltage to be approximately zero volts when the magnitude of the requested power is greater than a second threshold and the magnitude of the input current is less than a third threshold. The control circuit may be configured to control one or more drive signals provided to a gate drive circuit to adjust the magnitude of an output current or the output voltage based on the second feedback signal indicative of the magnitude of the output voltage.

The power supply may include an error-generation circuit. In some examples, the error-generation circuit may be external to the control circuit. In other examples, the error-generation circuit may be internal to the control circuit. The error-generation circuit may be configured receive the second feedback signal indicative of the magnitude of the output voltage from the power converter circuit and a target voltage indicative of a desired magnitude of the output voltage. The error-generation circuit may be configured to generate a signal indicative of the magnitude of the requested power in response to the target voltage and the second feedback signal. The control circuit may be configured to receive the signal indicative of the magnitude of the requested power from the error-generation circuit. The control circuit may be configured to determine the magnitude of the requested power based on the signal indicative of the magnitude of the requested power. In some examples, the control circuit may be configured to control the power converter circuit to adjust the magnitude of the output voltage towards the desired magnitude in response to the signal indicative of the magnitude of the requested power. In some examples, the control circuit may be configured to compare the magnitude of the input current to an input current threshold to detect an over-power condition, and control the magnitude of the output voltage to be approximately zero volts in response to the detection of the over-power condition. In some examples, the control circuit may be configured to determine an input power of the power converter circuit based on the magnitude of the input current and the magnitude of input voltage of the power converter circuit, compare the magnitude of the input power of the power converter circuit to an input power threshold to detect an over-power condition, and control the magnitude of the output voltage to be approximately zero volts in response to the detection of the over-power condition.

The control circuit is further configured to receive the second signal indicative of the magnitude of the output voltage from the power converter circuit, and determine the magnitude of the requested power from the second feedback signal. For instance, in some of those examples, the control circuit may comprises the error-generation circuit. The error-generation circuit may be configured receive the signal indicative of the magnitude of the output voltage from the power converter circuit and generate a signal indicative of the magnitude of the requested power, and the control circuit may be configured to determine the magnitude of the requested power based on the signal indicative of the magnitude of the requested power. For example, the control circuit may be configured to sample the signal indicative of the magnitude of the output voltage to determine the magnitude of the output voltage, and determine the requested power based on the determined magnitude of the output voltage.

The control circuit may be configured to compare the magnitude of the requested power to the second threshold, and compare the magnitude of the input current indicated by the feedback signal to the third threshold. The control circuit may be configured to control the magnitude of the output voltage to be approximately zero volts when the first feedback signal (e.g., the magnitude of the input current indicated by the first feedback signal) is greater than a fourth threshold indicative of an over-current condition. In some examples, the first threshold may be greater than the fourth threshold. The control circuit may be configured to operate in a normal operating mode when the first feedback signal (e.g., the magnitude of the input current indicated by the first feedback signal) is greater than the third threshold but less than the first threshold, and the magnitude of the requested power is greater than the second threshold.

The control circuit may be configured to generate a drive signal to control the power converter circuit to adjust an average magnitude of the output voltage. The control circuit may be configured to control the drive signal to adjust the magnitude of the output voltage to be approximately zero volts when the magnitude of the requested power is greater than the second threshold and the magnitude of input current indicated by the feedback signal is less than the third threshold.

The second threshold may be determined such that the magnitude of the requested power is configured to exceed the second threshold when the power supply is supplying power during a normal operating mode. The signal indicative of the magnitude of the output voltage may indicate an operating period of one or more switching circuits of the power converter circuit, and/or the second threshold may be an operating period threshold. The first threshold may be a maximum power threshold. The third threshold may be a low-end power threshold that is less than the maximum power threshold.

In some examples, the power converter circuit may include a half-bridge converter circuit. For example, the power converter circuit may include a half-bridge inverter circuit that includes two switching circuits for generating an inverter voltage. The power converter circuit may include a transformer that includes a primary side configured to receive the inverter voltage and a secondary side configured to provide the output voltage from the power supply. The power converter circuit may include an error generation circuit located on the secondary side of the transformer and coupled across the output voltage. The error generation circuit may be configured to generate the signal indicative of the magnitude of the output voltage. In some examples, the power supply may be configured to filter and amplify a sense signal to generate the feedback signal. For example, the power supply may include a sense resistor, and the input current may be conducted through the sense resistor to generate the sense signal across the sense resistor. In some examples, the power supply may include an AC-to-DC converter circuit configured to receive an alternating-current (AC) voltage and generate the DC voltage. In such examples, the control circuit may be configured to provide a bus voltage control signal to the AC-to-DC converter circuit for adjusting a magnitude of the DC voltage, and receive a bus voltage feedback signal that indicates the magnitude of the DC voltage from the AC-to-DC converter circuit.

A power supply may include a power converter circuit that is configured to control a magnitude of an output voltage to control the amount of power delivered by the power supply. The power converter circuit may include a half-bridge inverter circuit comprising two switching circuits for generating an inverter voltage from a direct-current (DC) voltage, a transformer comprising a primary winding configured to receive the inverter voltage and a secondary winding configured from which the output voltage of the power supply is generated, and an error generation circuit located on the secondary side of the transformer and coupled across the output voltage, wherein error generation circuit is configured to generate a signal indicative of the magnitude of the output voltage. The power supply may include an over-power protection circuit in series with one of the switching circuits of the half-bridge inverter. The over-power protection circuit may be configured to receive a feedback signal indicative of a magnitude of an input current on the primary side of the transformer, and control the magnitude of the output voltage to be zero volts in response to the magnitude of the input current exceeding a first threshold indicative of an over-power condition. The power supply may include a control circuit configured to determine a magnitude of a requested power based on the signal indicative of the magnitude of the output voltage, and control the magnitude of the output voltage to be zero volts when the magnitude of the requested power is greater than a second threshold and the magnitude of input current indicated by the feedback signal is less than a third threshold.

A power supply may include a power converter circuit, an over-power protection circuit, and a control circuit. The power converter circuit may be configured to control a magnitude of an output voltage, and generate a first feedback signal indicative of a magnitude of an input current of the power converter circuit and a second feedback signal indicative of the magnitude of the output voltage. The over-power protection circuit may be configured to receive the first feedback signal indicative of a magnitude of the input current of the power converter circuit, and disable the power converter circuit in response to the magnitude of the input current indicating an over-power condition. The control circuit may be configured to determine a magnitude of a requested power based on the second feedback signal indicative of the magnitude of the output voltage, and disable the power converter circuit when the magnitude of the requested power indicates that the power converter circuit is supplying power to the electrical load and the magnitude of the input current indicated by the first feedback signal is less than a third threshold.

A power supply may include a power converter circuit, an over-power protection circuit, and a control circuit. The power converter circuit may be configured to control a magnitude of an output voltage, and generate a first feedback signal indicative of a magnitude of an input current of the power converter circuit and a second feedback signal indicative of the magnitude of the output voltage. The over-power protection circuit may be configured to receive the first feedback signal indicative of a magnitude of the input current of the power converter circuit, and disable the power converter circuit in response to the magnitude of the input current indicating an over-power condition. The control circuit may be configured to determine a magnitude of a requested power based on the second feedback signal indicative of the magnitude of the output voltage, and disable the power converter circuit when the magnitude of the requested power indicates that the power converter circuit is supplying power to the electrical load and the magnitude of the input current indicates that a component of the power converter circuit has faulted.

A power supply may include a power converter circuit, an over-power protection circuit, and a control circuit. The power converter circuit may be configured to control a magnitude of an output voltage, and generate a first feedback signal indicative of a magnitude of an input current of the power converter circuit and a second feedback signal indicative of the magnitude of the output voltage. The over-power protection circuit may be configured to receive the first feedback signal indicative of a magnitude of the input current of the power converter circuit, and disable the power converter circuit in response to the magnitude of the input current indicating an over-power condition. The control circuit may be configured to determine a magnitude of a requested power based on the second feedback signal indicative of the magnitude of the output voltage, and disable the power converter circuit when the magnitude of the requested power and the magnitude of the input current indicate that a component of the regulator circuit has faulted.

A power supply may include a power converter circuit, an over-power protection circuit, and a control circuit. The power converter circuit may be configured to control a magnitude of an output voltage, and generate a first feedback signal indicative of a magnitude of an input current of the power converter circuit and a second feedback signal indicative of the magnitude of the output voltage. The over-power protection circuit may be configured to receive the first feedback signal indicative of a magnitude of the input current of the power converter circuit, and disable the power converter circuit in response to the magnitude of the input current indicating an over-power condition. The control circuit may be configured to determine a magnitude of a requested power based on the second feedback signal indicative of the magnitude of the output voltage, and disable the power converter circuit when the magnitudes of the requested power and the input current indicate that a component of a current sense circuit of the power converter circuit has faulted.

A power supply may include a power converter circuit, an over-power protection circuit, and a control circuit. The power converter circuit may be configured to control a magnitude of an output voltage, and generate a first feedback signal indicative of a magnitude of an input power of the power converter circuit and a second feedback signal indicative of the magnitude of the output voltage. The over-power protection circuit may be configured to receive the first feedback signal indicative of the magnitude of the input power of the power converter circuit, and disable the power converter circuit in response to the magnitude of the input power indicating an over-power condition. The control circuit may be configured to detect that a component of the regulator circuit has faulted based on the first feedback signal and the second feedback signal, and control one or more drive signals provided to a gate drive circuit to adjust the magnitude of an output current or the output voltage based on the second feedback signal. The control circuit may be configured to perform closed-loop gate drive based on the second feedback signal.

DETAILED DESCRIPTION

Figure 1:
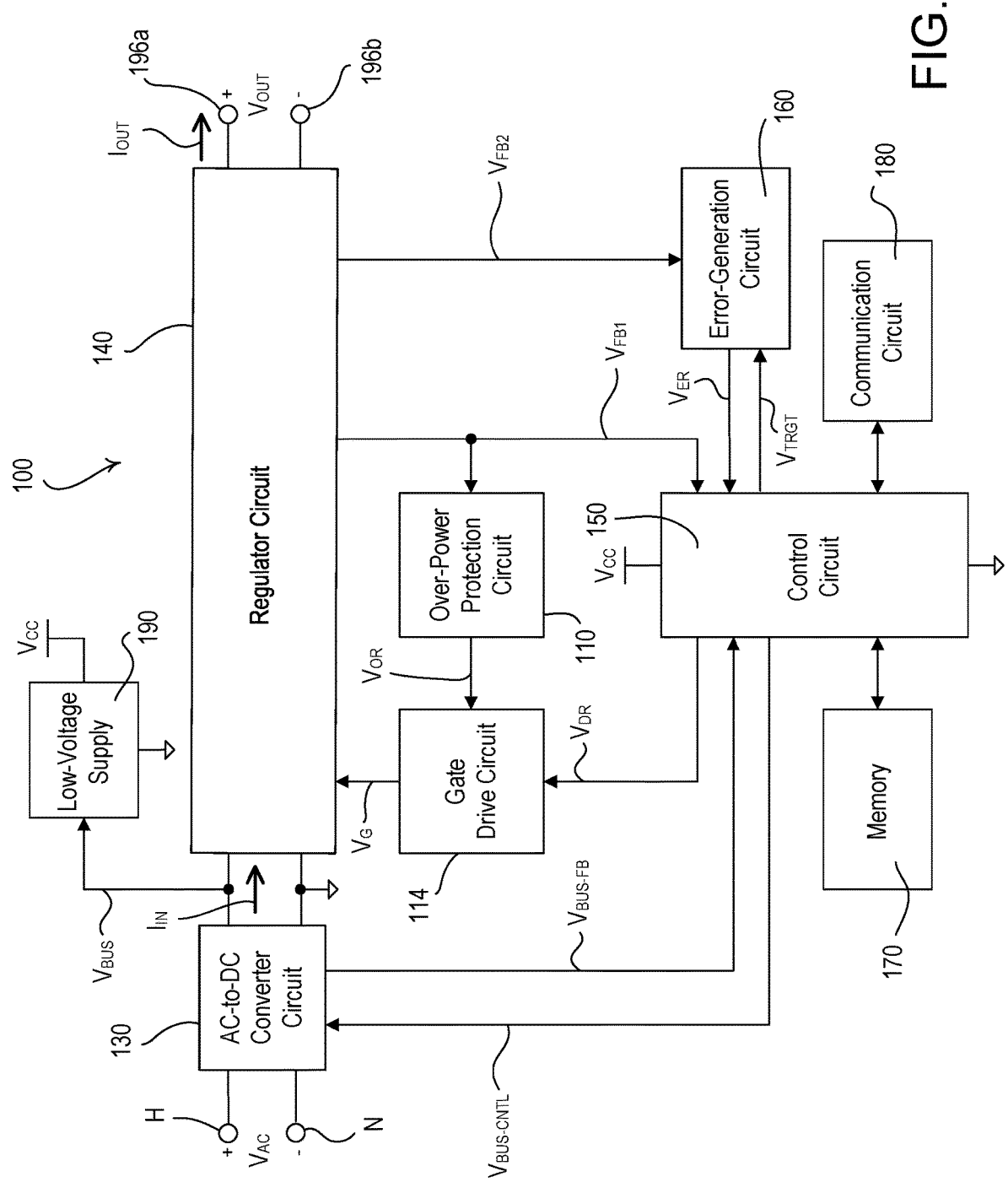
FIG. 1 is a simplified block diagram of an example power supply that is configured to supply an amount of power.

FIG. 1 is a simplified block diagram of an example power supply 100 that is configured to supply an amount of power, which for example, may be delivered to an electrical load. In some examples, the power supply 100 may be a constant-voltage power supply that delivers an output voltage $V_{OUT}$ (e.g., a direct-current (DC) voltage) having a substantially constant magnitude and/or generates a constant bus voltage $V_{BUS}$. Although described primarily in the context of a constant-voltage power supply, in other examples the power supply 100 may be a constant-current power supply or a power supply that varies both voltage and current when supplying power to an electrical load. In some examples, the power supply 100 may be configured to supply power to a light-emitting diode (LED) driver, a motorized window treatment, a communication link, or the like. The power supply 100 may comprise a hot terminal H and a neutral terminal N that are adapted to be coupled to an alternating-current (AC) power source (not shown) for receiving an AC mains line voltage $V_{AC}$.

The power supply 100 may comprise a first power converter circuit, such as an AC-to-DC converter circuit 130, and a second power converter circuit, such as a regulator circuit 140. In addition, the power supply 100 may comprise a control circuit 150, an error-generation circuit 160, a memory 170, a communication circuit 180, and/or a low-voltage supply 190.

The AC-to-DC converter circuit 130 may receive the AC mains line voltage $V_{AC}$ and generate a DC bus voltage $V_{BUS}$ (e.g., a DC voltage) across a bus capacitor (not shown). The AC-to-DC converter circuit 130 may also operate as a power-factor correction circuit to improve the power factor of the power supply 100 (e.g., to adjust the power factor of the power supply towards a power factor of one). The AC-to-DC converter circuit 130 may comprise a rectifier circuit (not shown) for generating a rectified voltage from the AC mains line voltage $V_{AC}$. The AC-to-DC converter circuit 130 may also comprise a boost converter circuit (not shown) configured to receive the rectified voltage and generate the DC bus voltage $V_{BUS}$ as a boosted DC bus voltage. The magnitude of the DC bus voltage $V_{BUS}$ may be greater than a peak magnitude of the AC mains line voltage $V_{AC}$. Although described with reference to a boost converter, the AC-to-DC converter circuit 130 may comprise any suitable power converter circuit for generating an appropriate bus voltage, such as, for example, a flyback converter circuit, a single-ended primary-inductor converter (SEPIC), a Ćuk converter, or other suitable power converter circuit.

The regulator circuit 140 may receive the bus voltage $V_{BUS}$ and generate the output voltage $V_{OUT}$ (e.g., having a constant magnitude) across a power range. An example of the load regulation circuit 140 may be an isolated, half-bridge forward converter. An example of a forward converter that may be used in the power supply 100 is described in greater detail in commonly-assigned U.S. Pat. No. 9,253,829, filed Feb. 2, 2016, entitled LOAD CONTROL DEVICE FOR A LIGHT-EMITTING DIODE LIGHT SOURCE, the entire disclosure of which is hereby incorporated by reference. Alternatively or additionally, the regulator circuit 140 may comprise, for example, a buck converter, a linear regulator, a flyback converter, and/or any suitable drive circuit for controlling the power delivered by the power supply.

The control circuit 150 may be configured to control the operation of the AC-to-DC converter circuit 130 and/or the regulator circuit 140. The control circuit 150 may comprise, for example, a digital controller or any other suitable processing device, such as, for example, a microcontroller, a programmable logic device (PLD), a microprocessor, an application specific integrated circuit (ASIC), or a field-programmable gate array (FPGA) that is configured and or programmed to operate in the manner described herein. The control circuit 150 may receive a bus voltage feedback signal $V_{BUS-FB}$ from the AC-to-DC converter circuit 130. The bus voltage feedback signal $V_{BUS-FB}$ may indicate the magnitude of the bus voltage $V_{BUS}$. The control circuit 150 may generate a bus voltage control signal $V_{BUS-CNTL}$, which may be provided to the AC-to-DC converter circuit 130 for adjusting the magnitude of the bus voltage $V_{BUS}$. In some examples, the control circuit 150 may generate a bus voltage control signal $V_{BUS-CNTL}$ based on the bus voltage feedback signal $V_{BUS-FB}$.

The power supply 100 may include a gate drive circuit 114, which may generate one or more gate voltages $V_G$ for controlling one or more switching circuits (e.g., controllably conductive devices) of the regulator circuit 140 (e.g., two field effect transistors (FETs) of a half-bridge inverter circuit). The gate voltages $V_G$ may be coupled to gates of the respective switching circuits via the gate drive circuit 114. The control circuit 150 may generate at least one drive signal $V_{DR}$ for controlling the gate drive circuit 114 to generate the gate voltages $V_G$ to render the switching circuits conductive and non-conductive. The control circuit 150 may control at least one drive signal $V_{DR}$ to control the regulator circuit 140 to generate the output voltage $V_{OUT}$ (e.g., to maintain the magnitude of the output voltage $V_{OUT}$ at a constant magnitude). The control circuit 150 may be configured to control the regulator circuit 140 to adjust the magnitude of an output voltage VOUT generated across the output terminals 196a, 196b of the power supply 100 and/or the magnitude of an output current $I_{OUT}$ of the power supply. The control circuit 150 may adjust an operating frequency fop and/or a duty cycle $DC_{INV}$ (e.g., an on-time $T_{ON}$) of the one or more drive signals $V_{DR}$ to maintain the magnitude of the output voltage $V_{OUT}$ at a constant magnitude (e.g., when the power supply 100 is a constant-voltage power supply that generates a constant bus voltage $V_{BUS}$). Although illustrated as a separate circuit, in some examples, the gate drive circuit 114 may be part of (e.g., integrated with) the regulator circuit 140.

The power supply 100 may include an over-power protection circuit 110. In examples where the power supply 100 is a constant-voltage power supply, the over-power protection circuit 110 may be an over-current protection circuit. The over-power protection circuit 110 may be configured to receive a first feedback signal $V_{FB1}$. The first feedback signal $V_{FB1}$ that may be indicative of the magnitude of an input current $I_{IN}$ of the regulator circuit 140 (e.g., when the power supply 100 is a constant-voltage power supply). In examples where the regulator circuit 140 comprises a transformer, the first feedback signal $V_{FB1}$ may be generated on the primary side of the transformer. For instance, the regulator circuit 140 may comprise a sense resistor (e.g., sense resistor $R_{SENSE}$ shown in FIG. 2) in series with a switching circuit of the regulator circuit 140 (e.g., a low-side FET of a half-bridge inverter circuit). In such examples, the regulator circuit 140 may be configured to generate the first feedback signal $V_{FB1}$ in response to a sense current $I_{SENSE}$ conducted through the sense resistor (e.g., conducted through the low-side FET of the half-bridge inverter).

The over-power protection circuit 110 may be configured to disable the power supply 100 (e.g., cause the magnitude of the output voltage $V_{OUT}$ to be approximately zero volts) based on the magnitude of the first feedback signal $V_{FB1}$. For example, the over-power protection circuit 110 may be configured to disable the power supply 100 when an input power $P_{IN}$ of the regulator circuit 140 (e.g., based on the first feedback signal $V_{FB1}$) exceeds a threshold, such as a power-limit threshold $P_{TH-PL}$. The first feedback signal $V_{FB1}$ may be indicative of the input current $I_{IN}$, and the input current $I_{IN}$ may be indicative of the input power $P_{IN}$ (e.g., when the power supply 100 is a constant-voltage power supply that is, for example, configured to generate a bus voltage $V_{BUS}$ at a constant magnitude at the input of the regulator circuit 140). Therefore, the over-power protection circuit 110 may be configured to disable the power supply 100 when the input power $P_{IN}$ (e.g., based on the first feedback signal $V_{FB1}$) exceeds the power-limit threshold $P_{TH-PL}$. As described in more detail herein, in some examples, the over-power protection circuit 110 may comprise analog circuitry.

The power-limit threshold $P_{TH-PL}$ may indicate a maximum power threshold for the power supply 100, for example, as defined by standards developed by Underwriters Laboratories (UL) for power supplies, such as for Class 2 power supplies. In some examples, the power-limit threshold $P_{TH-PL}$ may be configured in the range of 95-100 watts. As such, the power-limit threshold $P_{TH-PL}$ may be indicative of an overload condition (e.g., an over-power condition and/or an over-current condition). An overload condition may be caused, for example, by a fault in the electrical load that is coupled to the output terminal 196a 196b of the power supply 100 and/or too much load coupled to the output terminal 196a 196b. In a voltage-controlled power supply, the over-power condition and the over-current condition may be the same, for example, because the AC-to-DC converter circuit 130 may be configured to generate a bus voltage $V_{BUS}$ at a constant magnitude at the input of the regulator circuit 140.

The over-power protection circuit 110 may generate an override signal $V_{OR}$ for controlling the gate drive circuit 114 to control the magnitude of the output voltage $V_{OUT}$ to approximately zero volts in response to detecting an overload condition (e.g., when the magnitude of the input power $P_{IN}$ exceeds the power-limit threshold $P_{TH-PL}$). For example, in response to the magnitude of the input power $P_{IN}$ exceeding the power-limit threshold $P_{TH-PL}$ (e.g., based on the first feedback signal $V_{FB1}$), the over-power protection circuit 110 may provide the override signal $V_{OR}$ to the gate drive circuit 114, which may control one or more switching circuits of the regulator circuit 140 to operate such that the magnitude of the output voltage $V_{OUT}$ is controlled to approximately zero volts. For example, the over-power protection circuit 110 may be configured to render a low-side switching circuit (e.g., a low-side field effect transistor (FET)) of the regulator circuit 140 conductive and render a high-side switching circuit (e.g., a high-side FET) of the regulator circuit 140 non-conductive to disable the power supply 100 in response to detecting an over-power condition (e.g., in examples where the regulator circuit 140 comprises a half-bridge converter, such as an isolated, half-bridge forward converter).

The control circuit 150 may receive one or more feedback signals from the regulator circuit 140 (e.g., directly or indirectly from the regulator circuit 140). For example, the control circuit 150 may receive the first feedback signal $V_{FB1}$, and as discussed in more detail below, an error signal $V_{ER}$ that is generated based on a second feedback signal $V_{FB2}$. As noted above, the first feedback signal $V_{FB1}$ may be indicative of the magnitude of the input current $I_{IN}$ of the regulator circuit 140 (e.g., when the power supply 100 is a constant-voltage power supply). In some examples, the control circuit 150 may be configured to determine a magnitude of the input power $P_{IN}$ of the regulator circuit 140 in response to the magnitude of the input current $I_{IN}$ (e.g., as determined from the first feedback signal $V_{FB1}$, where the first feedback signal $V_{FB1}$ may be indicative of the sense current $I_{SENSE}$) and the magnitude of the bus voltage $V_{BUS}$ (e.g., as determined from the bus voltage feedback signal $V_{BUS-FB}$) (e.g., $P_{IN}=V_{BUS} \cdot I_{SENSE}$).

The control circuit 150 may be configured to detect an overload condition based on the first feedback signal $V_{FB1}$. For example, the control circuit 150 may be configured to determine the magnitude of the input current $I_{IN}$ based on the feedback signal $V_{FB1}$, and configured to determine the magnitude the input power $P_{IN}$ of the regulator circuit 140 based on the magnitude of the input current $I_{IN}$ and the magnitude of the bus voltage $V_{BUS}$ (e.g., as determined from the bus voltage feedback signal $V_{BUS-FB}$) (e.g., $P_{IN}=V_{BUS} \cdot I_{IN}$). The control circuit may compare the magnitude the input power $P_{IN}$ with a threshold, such as the power-limit threshold $P_{TH-PL}$, and control the magnitude of the output voltage $V_{OUT}$ to approximately zero volts in response to detecting an overload condition (e.g., when the magnitude of the input power $P_{IN}$ exceeds the power-limit threshold $P_{TH-PL}$). Accordingly, in such examples, the control circuit 150 and the over-power protection circuit 110 may be configured to shut down the power supply (e.g., de-energize the power supply 100 and/or cause the magnitude of the output voltage $V_{OUT}$ to be approximately zero volts) when the magnitude of the input power $P_{IN}$ is greater than a threshold, such as the power-limit threshold $P_{TH-PL}$ (e.g., greater than the UL defined power limit of the power supply). Alternatively or additionally, the control circuit may compare the magnitude the input current $I_{IN}$ with a threshold, such as a current-limit threshold $I_{TH-CL}$, and control the magnitude of the output voltage $V_{OUT}$ to approximately zero volts in response to detecting an overload condition (e.g., when the magnitude of the input current $I_{IN}$ exceeds the current-limit threshold $I_{TH-CL}$).

In some examples, the control circuit 150 may trigger faster than the over-power protection circuit 110 in response to an overload condition. This may be due to the control circuit 150 operating quicker than the over-power protection circuit 100. Alternatively or additionally, the threshold used by the control circuit 150 when detecting an overload condition may be, but does not necessarily have to be the same as the threshold used by the over-power protection circuit 110 (e.g., power-limit threshold $P_{TH-PL}$). For instance, in some examples, the threshold used by the control circuit 150 may be set to be slightly lower than the power-limit threshold $P_{TH-PL}$ used by the over-power protection circuit 110 (e.g., 95 watts as opposed to 96 watts used as the power-limit threshold $P_{TH-PL}$). Accordingly, in such examples, the control circuit 150 may cause the power supply 100 to shut down before the over-power protection circuit 110.

The power supply 100 may comprise the error-generation circuit 160. In some examples, the error-generation circuit 160 may comprise an integrating amplifier circuit, such as a proportional integral (PI) controller. In some examples, the error-generation circuit 160 may be part of the control circuit 150. The error-generation circuit 160 may receive a second feedback signal $V_{FB2}$ from the regulator circuit 140 and a target voltage $V_{TRGT}$ from the control circuit 150. The second feedback signal $V_{FB2}$ may be indicative of the magnitude of the output voltage $V_{OUT}$ of the power supply 100. For example, the error-generation circuit 160 may be coupled across the output voltage $V_{OUT}$. In some instances, the error-generation circuit 160 may comprise an optocoupler, where an emitter (e.g., photoemitter) of the optocoupler is located within the regulator circuit 140 on a secondary side of a transformer and a receiver (e.g., photosensor) of the optocoupler is configured to generate the second feedback signal $V_{FB2}$.

The error-generation circuit 160 may receive the target voltage $V_{TRGT}$ from the control circuit 150. The magnitude of the target voltage $V_{TRGT}$ may indicate a target magnitude $V_{OUT-TRGT}$ for the output voltage $V_{OUT}$ of the power supply 100, for example, when the power supply 100 is a constant-voltage power supply. Accordingly, the target magnitude $V_{OUT-TRGT}$ of the output voltage $V_{OUT}$ may indicate a desired magnitude of the output voltage $V_{OUT}$ (e.g., the magnitude of the constant-voltage that the power supply 100 is configured to generate). In examples where the power supply 100 is a constant-current power supply, the error-generation circuit 160 may receive a target voltage $V_{I-TRGT}$ may indicate a target magnitude $V_{OUT-I-TRGT}$ for the output current $I_{OUT}$ of the power supply 100, for example.

The error-generation circuit 160 may generate an error signal $V_{ER}$ and provide the error signal $V_{ER}$ to the control circuit 150. The error-generation circuit 160 may be configured to generate the error signal $V_{ER}$ based on the second feedback signal $V_{FB2}$ and the target voltage $V_{TRGT}$. The error signal $V_{ER}$ may be indicative of the magnitude of a requested input power $P_{RQST}$ of the power supply 100. For example, the requested input power $P_{RQST}$ may represent the amount of power that needs to be drawn from the bus voltage $V_{BUS}$ to generate the output voltage $V_{OUT}$ at the output current $I_{OUT}$. The requested input power $P_{RQST}$ may represent an amount of power to which the input current $I_{IN}$ of the regulator circuit 140 may be adjusted as the control circuit 150 controls the regulator circuit 140 to generate the output voltage $V_{OUT}$ at the output current $I_{OUT}$. Further, the error signal $V_{ER}$ may be indicative of the difference between the actual output voltage $V_{OUT}$ (e.g., based on the second feedback signal $V_{FB2}$) and the target voltage $V_{TRGT}$. The magnitude of the target voltage $V_{TRGT}$ may indicate the desired magnitude of the output voltage $V_{OUT}$ (e.g., the rated output voltage of the power supply 100). In some examples, the error-generation circuit 160 may comprise a proportional-integral-derivative (PID) controller, and the error signal $V_{ER}$ may be indicative of the integration/accumulation of difference between the target voltage $V_{TRGT}$ and the output voltage $V_{OUT}$ over time.

The control circuit 150 may regulate the magnitude of the output voltage $V_{OUT}$ based on the error signal $V_{ER}$. For example, the control circuit 150 may perform closed-loop gate drive control based on the error signal $V_{ER}$. The control circuit 150 may control the magnitude of the output voltage $V_{OUT}$ based on the error signal $V_{ER}$. For instance, the control circuit 150 may control the drive signals $V_{DR}$ provided to the gate drive circuit 114 to adjust the magnitude of the output voltage $V_{OUT}$ to the target magnitude $V_{OUT-TRGT}$ of the output voltage $V_{OUT}$ based on the error signal $V_{ER}$. Further, when operating as a constant-voltage power supply, the control circuit 150 may adjust the operation of the regulator circuit 140 (e.g., adjust the operating frequency fop and/or a duty cycle $DC_{INV}$ (e.g., an on-time $T_{ON}$) of the drive signals $V_{DR}$) to maintain the magnitude of the output voltage $V_{OUT}$ at the constant magnitude in response to the error signal $V_{ER}$. Examples of load control devices with closed-loop gate drive control include U.S. Pat. No. 5,041,763, issued Aug. 20, 1991, U.S. Pat. No. 8,466,628, issued Jun. 18, 2013, and U.S. Pat. Pub. No. US 2020/0366188, published Nov. 19, 2020, all of which are incorporated herein by reference.

Further, the control circuit 150 may also use the error signal $V_{ER}$ (e.g., and/or the second feedback signal $V_{FB2}$) to detect (e.g., infer) a fault condition in the power supply 100. The control circuit 150 may detect a fault condition in the power supply 100, such as a fault of one or more of the components of the power supply 100 (e.g., a component fault), based on the error signal $V_{ER}$ and the first feedback signal $V_{FB1}$. For instance, the control circuit 150 may determine that the error signal $V_{ER}$ indicates that the requested input power $P_{RQST}$ is greater than a requested-power threshold $P_{TH-RQST}$ (e.g., indicating that the electrical load is drawing current), but the first feedback signal $V_{FB1}$ indicates that the input power $P_{IN}$ is less than a threshold, such as a low power threshold $P_{TH-LO}$ (e.g., indicating that the power supply 100 is not providing output power $P_{OUT}$ even though, for example, the power supply 100 may actually be providing output power $P_{OUT}$). Stated another way, the control circuit 150 may be configured to detect that the power supply 100 is attempting to deliver power (e.g., based on the requested power $P_{RQST}$) even though the input power $P_{IN}$ of the regulator circuit 140 appears to be low (e.g., approximately zero watts), for example, based on the first feedback signal $V_{FB1}$. In response, the control circuit 150 may determine (e.g., infer) that there might be a fault within one of the components of the power supply 100 (e.g., within the regulator circuit 140 and/or the over-power protection circuit 110) and/or the control circuit 150 may cause the magnitude of the output voltage $V_{OUT}$ to be reduced to approximately zero volts. For instance, the control circuit 150 may determine (e.g., infer) that there might be a fault within one of the components of the power supply 100 that are used to generate the first feedback signal $V_{FB1}$, which for example, may cause the first feedback signal $V_{FB1}$ to incorrectly identify the magnitude of the input current $I_{IN}$ (e.g., and incorrectly identify the magnitude of the input current $I_{IN}$ as being lower than it actually is). Stated another way, the fault in the one or more components of the power supply 100 may cause the magnitude of the first feedback signal $V_{FB1}$ to be too low, such that the over-current protection circuit 110 is not able to operate properly to prevent the output power from exceeding the output power limit. Accordingly, the control circuit 150 may perform closed-loop gate drive control and detect a component fault in the power supply 100 based on the error signal $V_{ER}$ and the first feedback signal $V_{FB1}$.

As noted above, the control circuit 150 may be configured to compare the magnitude of the input power $P_{IN}$ (e.g., as described based on the first feedback signal $V_{FB1}$) to the low power threshold $P_{TH-LO}$. The low power threshold $P_{TH-LO}$ may be less than the power-limit threshold $P_{TH-PL}$. In some examples, the low power threshold $P_{TH-LO}$ may be approximately 10 watts. The low power threshold $P_{TH-LO}$ may be set such that the magnitude of the input power $P_{IN}$ is greater than the low power threshold $P_{TH-LO}$ when the power supply 100 is providing output power $P_{OUT}$ during normal operation, and such that the magnitude of the input power $P_{IN}$ is less than the low power threshold $P_{TH-LO}$ when the power supply 100 is not providing output power $P_{OUT}$ during normal operation.

The control circuit 150 may compare the magnitude of the requested input power $P_{RQST}$ (e.g., indicated by the error signal $V_{ER}$) to the requested-power threshold $P_{TH-RQST}$. The requested-power threshold $P_{TH-RQST}$ may be determined such that the magnitude of the requested input power $P_{RQST}$ indicated by the error signal $V_{ER}$ exceeds the requested-power threshold $P_{TH-RQST}$ whenever the power supply 100 is providing output power $P_{OUT}$ to an electrical load during normal operation, and that the magnitude of the requested input power $P_{RQST}$ indicated by the error signal $V_{ER}$ is less than the requested-power threshold $P_{TH-RQST}$ whenever the power supply 100 is not providing output power $P_{OUT}$ to the electrical load during normal operation. If the electrical load is drawing current from the power supply 100, the requested input power $P_{RQST}$ may exceed a threshold (e.g., the requested-power threshold $P_{TH-RQST}$). If the electrical load is not drawing current from the power supply 100, the requested input power $P_{RQST}$ may be less than the threshold (e.g., the requested-power threshold $P_{TH-RQST}$).

When the power supply 100 is operating properly and supplying current to the electrical load, such as when the magnitude of the input power $P_{IN}$ is greater than the low power threshold $P_{TH-LO}$ but less than the power-limit threshold $P_{TH-PL}$, and the magnitude of the requested input power $P_{RQST}$ indicated by the error signal $V_{ER}$ is greater than the requested-power threshold $P_{TH-RQST}$, the control circuit 150 may be configured to control the regulator circuit 140 to regulate the magnitude of the output voltage $V_{OUT}$ towards the target magnitude $V_{OUT-TRGT}$ of the output voltage $V_{OUT}$ at the output terminals 196a, 196b of the power supply 100.

However, the control circuit 150 may be able to perform fault detection (e.g., and protection, for example, by shutting down the power supply 100) when the magnitude of the input power $P_{IN}$ is less than the low power threshold $P_{TH-LO}$ and the magnitude of the requested input power $P_{RQST}$ indicated by the error signal $V_{ER}$ is greater than the requested-power threshold $P_{TH-RQST}$. As noted above, the low power threshold $P_{TH-LO}$ is configured such that the magnitude of the input power $P_{IN}$ should be less than the low power threshold $P_{TH-LO}$ when the power supply 100 is not providing output power $P_{OUT}$ during normal operation. Further, the requested-power threshold $P_{TH-RQST}$ is configured such that the magnitude of the requested input power $P_{RQST}$ is greater than the requested-power threshold $P_{TH-RQST}$ when the power supply 100 is providing output power $P_{OUT}$ to an electrical load during normal operation. So, if the control circuit 150 determines that the magnitude of the input power $P_{IN}$ is less than the low power threshold $P_{TH-LO}$, but that the magnitude of the requested input power $P_{RQST}$ is greater than the requested-power threshold $P_{TH-RQST}$, the control circuit 150 may determine (e.g., infer) that one or more components of the power supply 100 are faulted. Stated another way, the first feedback signal $V_{FB1}$ may indicate that the power supply 100 is not providing power (e.g., even though the power supply may, in fact, be providing power), but the error signal $V_{ER}$ may indicate that the power supply 100 is providing power. This can occur when one or more components of the regulator circuit 140 and/or the over-power protection circuit 110 are faulted (e.g., open or shorted closed), such as a sense resistor of the regulator circuit 140. In response to a determination that one or more components of the power supply 100 are faulted, the control circuit 150 may be perform fault protection (e.g., shut down the power supply 100, for example, by causing the magnitude of the output voltage $V_{OUT}$ to be reduced to approximately zero volts).

Therefore, in the event that the first feedback signal $V_{FB1}$ is inaccurate (e.g., because the sense resistor of the regulator circuit 140 is faulted) and the over-power protection circuit 110 and/or the control circuit 150 were to fail to recognize and trip in an overload condition, the control circuit 150 would still be able to detect a fault condition (e.g., due to an internal component failing) and shut down the power supply 100 (e.g., control the magnitude of the output voltage $V_{OUT}$ to approximately zero volts). Accordingly, the power supply 100 may have redundant protection—meaning that if any single component in the power supply 100 were to fail (e.g., a component of any of the over-power protection circuit 110, the control circuit 150, the sense resistor, etc.), the power supply 100 would still be protected from the overload condition (e.g., since the control circuit 150 could detect this failure and cause the power supply 100 to shut down).

Further, since the control circuit 150 is configured to provide component fault detection (e.g., in addition to the overload protection provided by the over-power protection circuit 110 and/or the control circuit 150), the power supply 100 does not need to have two hardware-based over-power protection circuits. And further, since the control circuit 150 is configured to provide a hardware-based protection circuit at the input of the power supply 100, the power supply 100 may not include a voltage drop on the secondary side of the transformer of the regulator circuit 140. For example, the power supply 100 may be used in situations where any voltage drop in the output voltage $V_{OUT}$ could have negative effects to the downstream loads. As one example, the power supply 100 may be used to control a series of lighting loads that are coupled to the power supply 100 using a length of wire. Since the magnitude of the voltage may reduce the further the lighting loads are from the power supply 100 along the length of wire, the system may be limited to how many and/or how far the lighting loads may be from the power supply 100 if the power supply 100 were to include a voltage drop on the secondary side of the transformer. Therefore, the power supply 100 is benefited by being able to provide redundant protection without the introduction of a voltage drop on the secondary side of the transformer of the regulator circuit 140.

In some examples the error signal $V_{ER}$ may indicate the operating period Top and/or the frequency fop of the one or more switching circuits of the regulator circuit 140 (e.g., the operating period Top and/or the operating frequency fop of the one or more drive signals). For example, the power supply 100 may be configured such that the switching circuits of the regulator circuit 140 may be driven between a minimum operating period $T_{MIN}$ (e.g., which may correspond to 1 watt of output power $P_{OUT}$) and a maximum operating period $T_{MAX}$ (e.g., which may correspond to 200 watts of output power $P_{OUT}$). In such examples, the requested-power threshold $P_{TH-RQST}$ may be indicative of an operating period that is exceeded by the power supply 100 during normal operation (e.g., when providing the output power $P_{OUT}$).

The control circuit 150 may be coupled to the memory 170. The memory 170 may store one or more thresholds and/or operational characteristics of the power supply 100 (e.g., the first, second, and/or third thresholds, computer executable instructions for performing the procedures described herein, etc.). The memory 170 may be implemented as an external integrated circuit (IC) or as an internal circuit of the control circuit 150. The memory 170 may comprise a computer-readable storage media or machine-readable storage media that maintains computer-executable instructions for performing one or more procedure and/or functions as described herein. For example, the memory 170 may comprise computer-executable instructions or machine-readable instructions that when executed by the control circuit configure the control circuit to provide one or more portions of the procedures described herein. The control circuit 150 may access the instructions from memory 170 for being executed to cause the control circuit 150 to operate as described herein, or to operate one or more other devices as described herein. The memory 170 may comprise computer-executable instructions for executing configuration software. For example, the one or more thresholds and/or operational characteristics stored in the memory 170 may be configured during a configuration procedure of the power supply 100.

The communication circuit 180 may enable communication via, for example, a wired communication link or a wireless communication link, such as a radio-frequency (RF) communication link or an infrared (IR) communication link. The control circuit 150 may be configured to communicate (e.g., transmit and/or receive) communication signals, e.g., wired communication signals and/or wireless communication signals, such as RF signals, via the communication circuit 180. The communication circuit 180 may comprise, for example, an RF transceiver, an RF receiver, an RF transmitter, an infrared (IR) receiver, and/or other suitable wireless communication circuit. The control circuit 150 may be configured to communicate messages (e.g., digital messages) with external devices via the communication circuit 180. In addition, the control circuit 150 may be configured to update the thresholds and/or the operational characteristics stored in the memory 170 in response to messages (e.g., digital messages) received via the communication circuit 180. The low-voltage supply 190 may receive the bus voltage $V_{BUS}$ and generate a direct-current (DC) supply voltage $V_{CC}$ for powering the circuitry of the power supply 100.

Figure 2:
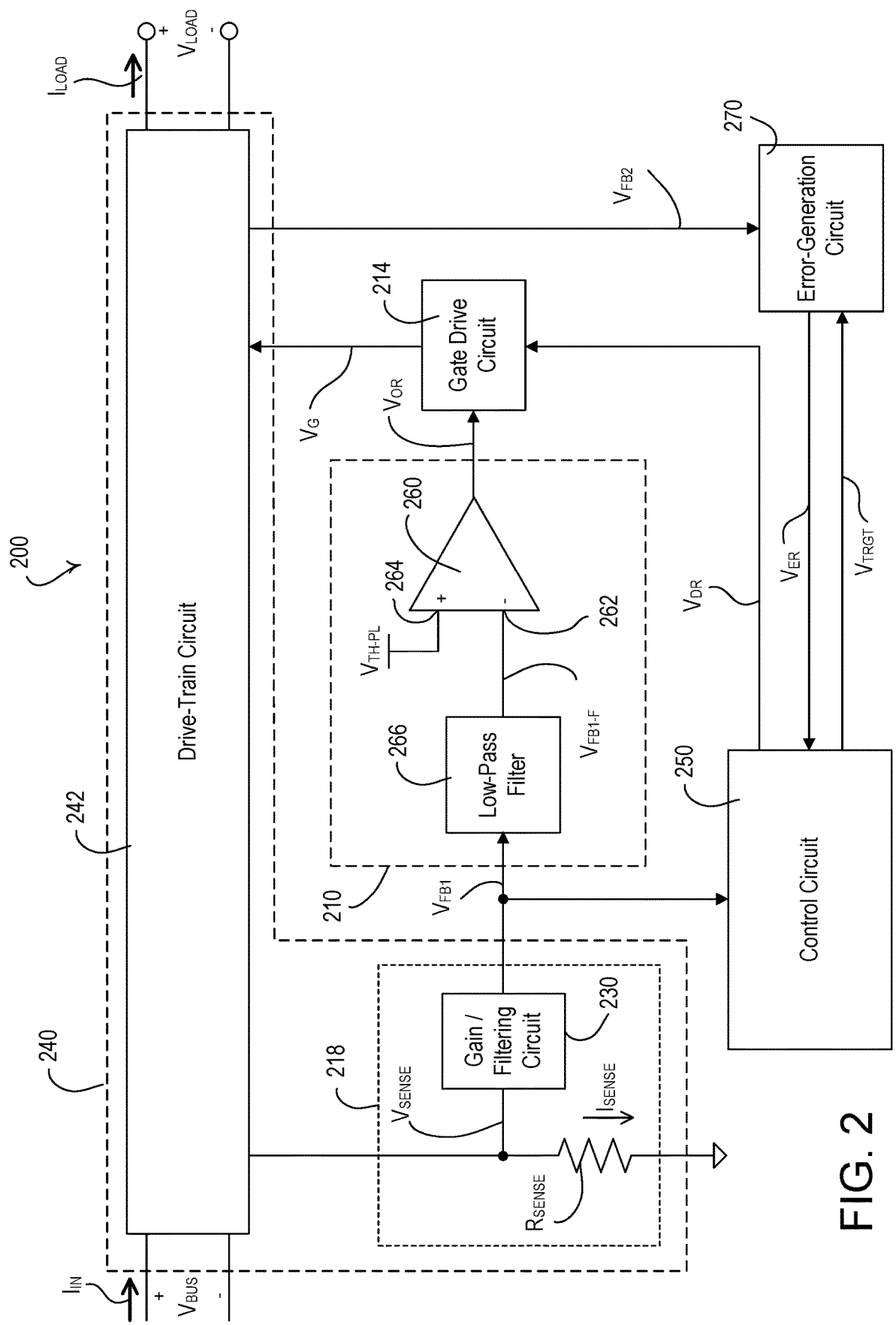
FIG. 2 illustrates an example over-power protection circuit of a power supply.

FIG. 2 illustrates an example over-power protection circuit 210 of a power supply 200, which may be used as the over-power protection circuit 110 of the power supply 100 of FIG. 1. Although not all the components of the power supply 200 are illustrated, the power supply 200 may be an example of the power supply 100 of FIG. 1. The power supply 200 may include a regulator circuit 240 (e.g., such as the regulator circuit 140 of FIG. 1), which may include a current sense circuit 218 and a drive-train circuit 242. The drive-train circuit 242 may include power converter components of the regulator circuit 240, such as any combination of one or more switching circuits, a transformer, a rectifier, and/or the like. In addition, the power supply 200 may include a gate drive circuit 214 may be an example of the gate drive circuit 114.

The current sense circuit 218 may include a sense resistor $R_{SENSE}$ and a gain and filtering circuit 230. The sense resistor $R_{SENSE}$ may be coupled in series with a switching circuit of the drive-train circuit 242 (e.g., a low-side FET of a half-bridge inverter circuit of the regulator circuit 242). The sense resistor $R_{SENSE}$ may produce a sense signal $V_{SENSE}$ in response to a sense current $I_{SENSE}$ conducted through the sense resistor $R_{SENSE}$ (e.g., conducted through the half-bridge inverter). The gain and filtering circuit 230 may be configured to amplify and filter the sense signal $V_{SENSE}$ generated across the sense resistor $R_{SENSE}$ to generate a first feedback signal $V_{FB1}$.

The power supply 200 may include a control circuit 250, which may be an example of the control circuit 150 of the power supply 100 of FIG. 1. The control circuit 250 may be configured to receive the first feedback signal $V_{FB1}$. The first feedback signal $V_{FB1}$ may be indicative of the magnitude of an input current $I_{IN}$ of the regulator circuit 240 (e.g., the drive-train circuit 242). For example, the control circuit 250 may determine the magnitude of the sense current $I_{SENSE}$ of the regulator circuit 240 in response to the first feedback signal $V_{FB1}$. The control circuit 250 may use the magnitude of the sense current $I_{SENSE}$ to determine the magnitude of the input power $P_{IN}$ of the regulator circuit 240. For example, the sense current $I_{SENSE}$ may be representative of (e.g., proportional to, such as half the magnitude of) the input current $I_{IN}$ of the regulator circuit 240. The control circuit 250 may use the magnitude of the sense current $I_{SENSE}$ and the magnitude of the bus voltage $V_{BUS}$ (e.g., which may be determined from the bus voltage feedback signal $V_{BUS\text{-}FB}$ and/or stored in memory of the power supply 200) to calculate the input power PIN, (e.g., $P_{IN}=V_{BUS} \cdot I_{SENSE}$).

The power supply 200 may also comprise an error-generation circuit 270 that may receive a second feedback signal $V_{FB2}$ and generate an error signal $V_{ER}$ that is provided to the control circuit 250. The error-generation circuit 270 may be an example of the error-generation circuit 160 of the power supply 100 of FIG. 1. Further, the second feedback signal $V_{FB2}$, the error signal $V_{ER}$, and the target voltage $V_{TRGT}$ illustrated in the power supply 200 of FIG. 2 may be the same as the second feedback signal $V_{FB2}$, the error signal $V_{ER}$, and the target voltage $V_{TRGT}$ illustrated in the power supply 100 of FIG. 1. Accordingly, the error-generation circuit 270 may be configured to generate the error signal $V_{ER}$ based on the second feedback signal $V_{FB2}$, and provide the error signal $V_{ER}$ to the control circuit 250.

Similar as described with reference to the control circuit 150 of the power supply 100 of FIG. 1, the control circuit 250 may regulate the magnitude of the output voltage $V_{OUT}$ based on the error signal $V_{ER}$. For example, the control circuit 250 may perform closed-loop gate drive control based on the error signal $V_{ER}$. The control circuit 250 may control the magnitude of the output voltage $V_{OUT}$ based on the error signal $V_{ER}$. For instance, the control circuit 250 may control the drive signals $V_{DR}$ provided to the gate drive circuit 214 to adjust the magnitude of the output voltage $V_{OUT}$ to the magnitude $V_{OUT\text{-}TRGT}$ of the output voltage $V_{OUT}$ based on the error signal $V_{ER}$. Further, when operating as a constant-voltage power supply, the control circuit 150 may adjust the operation of the regulator circuit 140 (e.g., adjust the operating frequency fop and/or a duty cycle $DC_{INV}$ (e.g., an on-time $T_{ON}$) of the drive signals $V_{DR}$) to maintain the magnitude of the output voltage $V_{OUT}$ at the constant magnitude in response to the error signal $V_{ER}$.

The control circuit 250 may be configured to detect an overload condition based on the first feedback signal $V_{FB1}$. For example, the control circuit 250 may be configured to determine the magnitude of the sense current $I_{SENSE}$ (e.g., and/or the input current $I_{IN}$) based on the feedback signal $V_{FB1}$, and configured to determine the magnitude the input power $P_{IN}$ of the regulator circuit 140 based on the magnitude of the sense current $I_{SENSE}$ (e.g., and/or the input current $I_{IN}$) and the magnitude of the bus voltage $V_{BUS}$. The control circuit 250 may compare the magnitude the input power $P_{IN}$ with a threshold, such as the power-limit threshold $P_{TH\text{-}PL}$, and control the magnitude of the output voltage $V_{OUT}$ to approximately zero volts in response to detecting an overload condition (e.g., when the magnitude of the input power $P_{IN}$ exceeds the power-limit threshold $P_{TH\text{-}PL}$). Accordingly, in such examples, the control circuit 250 and the over-power protection circuit 210 may be configured to shut down the power supply (e.g., de-energize the power supply 200 and/or cause the magnitude of the output voltage $V_{OUT}$ to be approximately zero volts) when the magnitude of the input power $P_{IN}$ is greater than a threshold, such as the power-limit threshold $P_{TH\text{-}PL}$ (e.g., greater than the UL defined power limit of the power supply). Alternatively or additionally, the control circuit 250 may compare the magnitude of the input current $I_{IN}$ to a threshold (e.g., an over-current threshold) to determine over-power condition (e.g., since the magnitude of the bus voltage $V_{BUS}$ may be maintained substantially constant), and/or the control circuit may calculate the magnitude of the input power $P_{IN}$ using the magnitude of the input current $I_{IN}$ and the magnitude of the bus voltage $V_{BUS}$ and compare the magnitude of the input power $P_{IN}$ to a threshold (e.g., an input-power threshold) to determine over-power condition.

The power supply 200 may also include a hardware protection circuit that is configured to detect an overload condition and shut down the power supply 200. The over-power protection circuit 210 may include a low-pass filter circuit 266 and a comparator 260. The low-pass filter circuit 266 may be configured to filter (e.g., apply a low-pass filter to) the first feedback signal $V_{FB1}$ to generate a filtered first feedback signal $V_{FB1\text{-}F}$. The low-pass filter circuit 266 may provide the filtered first feedback signal $V_{FB1\text{-}F}$ to a first input 262 of the comparator 260. The filter circuit 266 may stabilize the first feedback signal $V_{FB1}$ to generate the filtered first feedback signal $V_{FB1\text{-}F}$ because, for example, the filtered first feedback signal $V_{FB1\text{-}F}$ may have a more stable DC magnitude that can be more accurately compared to the power-limit threshold voltage $V_{TH\text{-}PL}$. The over-power protection circuit 210 may be configured to disable the power supply 200 in response to the detection of an overload condition. In some examples, the overload condition may be caused by a fault in the load that is coupled to the output terminal 196a 196b of the power supply 100 and/or too much load coupled to the to the output terminal 196a 196b.

A second input 264 of the comparator 260 may be configured to receive the power-limit threshold voltage $V_{TH\text{-}PL}$. The power-limit threshold voltage $V_{TH\text{-}PL}$ may be generated by the control circuit 250, a resistive divider circuit, or other suitable circuit. The power-limit threshold voltage $V_{TH\text{-}PL}$ may be indicative of a maximum power threshold for the power supply, for example, as defined by UL standards for power supplies, such as Class 2 power supplies (e.g., approximately 95-100 watts). The power-limit threshold voltage $V_{TH\text{-}PL}$ may be a fixed value and/or representative of the maximum power threshold for the power supply because, for example, the magnitude of the input voltage (e.g., the input voltage $V_{IN}$ or the bus voltage $V_{BUS}$) may have a substantially constant magnitude. The power-limit threshold $P_{TH\text{-}PL}$ used by the control circuit 250 may be the same as, or slightly different from, the power-limit threshold voltage $V_{TH\text{-}PL}$ used by the comparator 260. For instance, in some examples, the power-limit threshold $P_{TH\text{-}PL}$ may be set to be slightly lower than the power-limit threshold voltage $V_{TH\text{-}PL}$ (e.g., the power-limit threshold $P_{TH\text{-}PL}$ is set to 95 watts, while the power-limit threshold voltage $V_{TH\text{-}PL}$ is set to 96 watts). Accordingly, in such examples, the control circuit 250 may cause the power supply 200 to shut down before the over-power protection circuit 210.

The comparator 260 may generate the override signal $V_{OR}$ and provide the override signal $V_{OR}$ to the gate drive circuit 214 to shut down the power supply 200 (e.g., to control the magnitude of the output voltage $V_{OUT}$ to approximately zero volts) when the magnitude of the filtered first feedback signal $V_{FB1-F}$ is greater than the magnitude of the power-limit threshold voltage $V_{TH-PL}$. For example, the comparator 260 may compare the magnitude of the filtered first feedback signal $V_{FB1-F}$ to the power-limit threshold voltage $V_{TH-PL}$, which may be similar to a comparison between the input power $P_{IN}$ (e.g., as represented by the current through the low-side FET) to the power-limit threshold $P_{TH-PL}$ done by the control circuit 210. In some example, the comparator 260 may drive the override signal $V_{OR}$ low towards circuit common when the filtered first feedback signal $V_{FB1-F}$ exceeds the magnitude of the power-limit threshold voltage $V_{TH-PL}$ (e.g., which may then cause the gate drive circuit 214 to drive one or more of the gate voltages $V_G$ low to render the a switching circuit (e.g., FET) of the drive train circuit 242 non-conductive (e.g., prevent the drive-train from conducting input current)).

As such, the over-power protection circuit 210 may be configured to cause the magnitude of the output voltage $V_{OUT}$ to be approximately zero volts when the magnitude of the filtered first feedback signal $V_{FB1-F}$ is greater than the magnitude of the power-limit threshold voltage $V_{TH-PL}$, for example, by controlling the gate override signal $V_{OR}$ provided to the gate drive circuit 214. In response to receiving the override signal $V_{OR}$, the gate drive circuit 214 may control one or more switching circuits of the drive-train circuit 242 to operate such that the magnitude of the output voltage $V_{OUT}$ is controlled to approximately zero volts. In some examples, the over-power protection circuit 210 may be configured to render a low-side switching circuit (e.g., a low-side field effect transistor (FET)) of the drive-train circuit 242 conductive and render a high-side switching circuit (e.g., a high-side FET) of drive-train circuit 242 non-conductive to disable the power supply 200 in response to detecting an over-power condition. Accordingly, the over-power protection circuit 210 may be configured to disable the power supply 200 in response to the magnitude of the input power $P_{IN}$ (e.g., represented by the filtered first feedback signal $V_{FB1-F}$) exceeding the maximum power threshold (e.g., represented by the power-limit threshold voltage $V_{TH-PL}$) as defined by the UL standards.

The control circuit 250 may be configured to determine a component fault condition in the regulator circuit 240. The control circuit 250 may be configured to compare the magnitude of the input power $P_{IN}$ (e.g., as described based on the first feedback signal $V_{FB1}$) to a low power threshold $P_{TH-LO}$. The low power threshold $P_{TH-LO}$ may be less than the power-limit threshold $P_{TH-PL}$. In some examples, the low power threshold $P_{TH-LO}$ may be approximately 10 watts. The low power threshold $P_{TH-LO}$ may be set such that the magnitude of the input power $P_{IN}$ is greater than the low power threshold $P_{TH-LO}$ when the power supply 200 is providing output power $P_{OUT}$ during normal operation, and such that the magnitude of the input power $P_{IN}$ is less than the low power threshold $P_{TH-LO}$ when the power supply 200 is not providing output power $P_{OUT}$ during normal operation.

The control circuit 250 may be configured to compare the magnitude of a requested input power $P_{RQST}$ (e.g., indicated by the error signal $V_{ER}$) to a requested-power threshold $P_{TH-RQST}$. The requested-power threshold $P_{TH-RQST}$ may be determined such that the magnitude of the requested input power $P_{RQST}$ indicated by the error signal $V_{ER}$ exceeds the requested-power threshold $P_{TH-RQST}$ whenever the power supply 200 is providing output power $P_{OUT}$ to an electrical load during normal operation, and that the magnitude of the requested input power $P_{RQST}$ indicated by the error signal $V_{ER}$ is less than the requested-power threshold $P_{TH-RQST}$ whenever the power supply 200 is not providing output power $P_{OUT}$ to the electrical load during normal operation. If the electrical load is drawing current from the power supply 200, the requested input power $P_{RQST}$ may exceed a threshold (e.g., the requested-power threshold $P_{TH-RQST}$). If the electrical load is not drawing current from the power supply 200, the requested input power $P_{RQST}$ may be less than the threshold (e.g., the requested-power threshold $P_{TH-RQST}$).

When the power supply 200 is operating properly and supplying current to the electrical load, such as when the magnitude of the input power $P_{IN}$ is greater than the low power threshold $P_{TH-LO}$ but less than the power-limit threshold $P_{TH-PL}$, and the magnitude of the requested input power $P_{RQST}$ indicated by the error signal $V_{ER}$ is greater than the requested-power threshold $P_{TH-RQST}$, the control circuit 250 may be configured to control the drive-chain circuit 242 to regulate the magnitude of the output voltage $V_{OUT}$ towards the target magnitude $V_{OUT-TRGT}$ at the output terminals of the power supply 200.

However, the control circuit 250 may be able to perform fault protection (e.g., shut down the power supply 200, for example, by causing the magnitude of the output voltage $V_{OUT}$ to be reduced to approximately zero volts) when the magnitude of the input power $P_{IN}$ is less than the low power threshold $P_{TH-LO}$ and the magnitude of the requested input power $P_{RQST}$ indicated by the error signal $V_{ER}$ is greater than the requested-power threshold $P_{TH-RQST}$. As noted above, the low power threshold $P_{TH-LO}$ may be configured such that the magnitude of the input power $P_{IN}$ should be less than the low power threshold $P_{TH-LO}$ when the power supply 200 is not providing output power $P_{OUT}$ during normal operation. Further, the requested-power threshold $P_{TH-RQST}$ may be configured such that the magnitude of the requested input power $P_{RQST}$ is greater than the requested-power threshold $P_{TH-RQST}$ when the power supply 200 is providing output power $P_{OUT}$ to an electrical load during normal operation. So, if the control circuit 250 determines that the magnitude of the input power $P_{IN}$ is less than the low power threshold $P_{TH-LO}$, but that the magnitude of the requested input power $P_{RQST}$ is greater than the requested-power threshold $P_{TH-RQST}$, the control circuit 250 may determine (e.g., infer) that one or more components of the power supply 200 (e.g., the current sense circuit 218) are faulted. Stated another way, the first feedback signal $V_{FB1}$ may indicate that the power supply 200 is not providing power, but the error signal $V_{ER}$ may indicate that the power supply 200 is providing power. This can occur when one or more components of the regulator circuit 240 (e.g., the current sense circuit 218) and/or the over-power protection circuit 210 are faulted (e.g., open or shorted closed), such as a sense resistor $R_{SENSE}$ of the current sense circuit 218. In response to a determination that one or more components of the power supply 100 are faulted, the control circuit 250 may be perform protection (e.g., shut down the power supply 200, for example, by causing the magnitude of the output voltage $V_{OUT}$ to be reduced to approximately zero volts).

Therefore, in the event that the first feedback signal $V_{FB1}$ is inaccurate (e.g., because the sense resistor $R_{SENSE}$ of the regulator circuit 140 is faulted) and the over-power protection circuit 110 and the control circuit 150 were to fail to recognize and trip in an overload condition, the control circuit 150 would still be able to detect a fault condition (e.g., due to an internal component failing) and shut down the power supply 100 (e.g., control the magnitude of the output voltage $V_{OUT}$ to approximately zero volts). Accordingly, the power supply 100 may have component fault detection.

Figure 3:
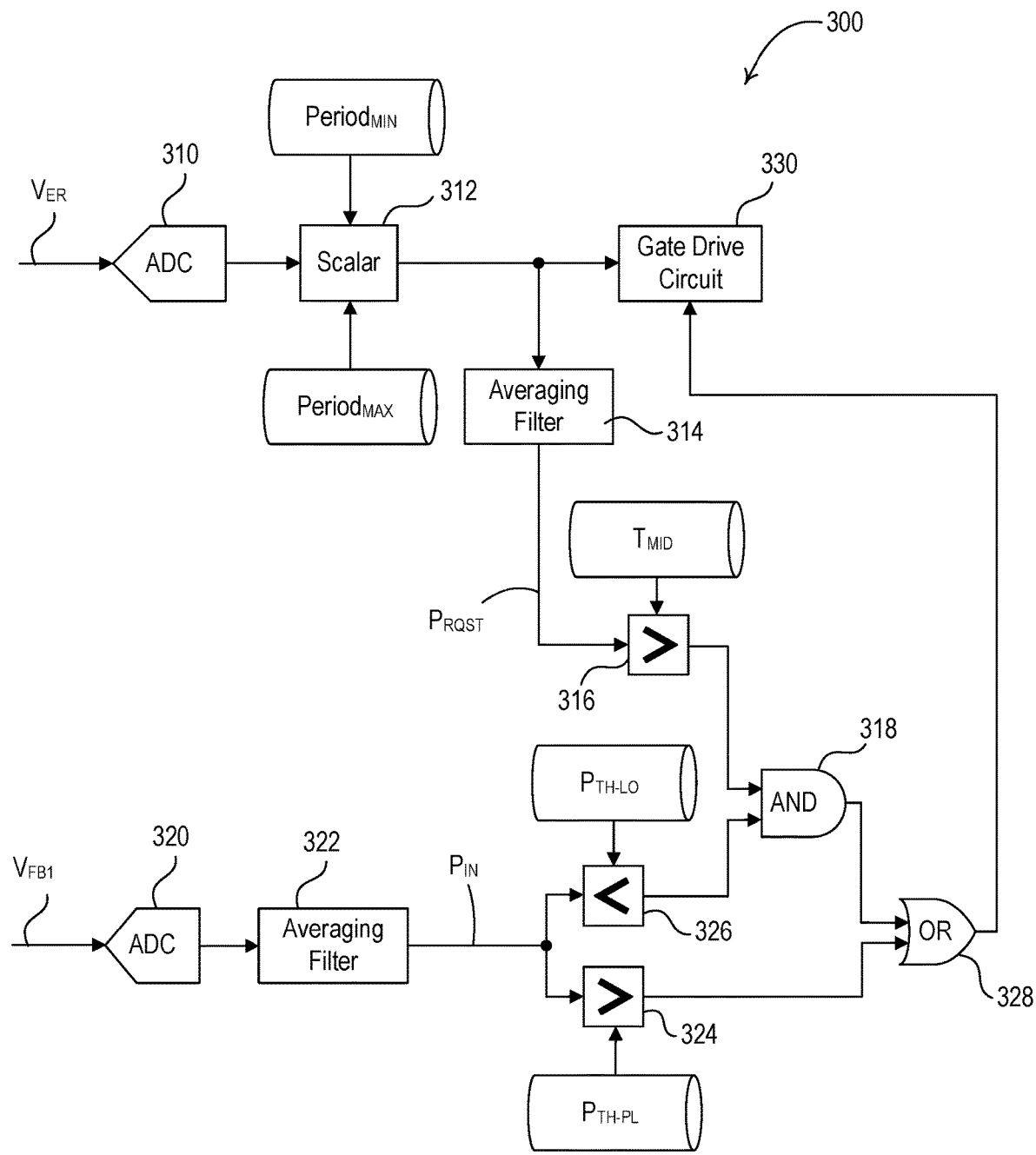
FIG. 3 illustrates a diagram of a protection system that may be implemented in a power supply.

FIG. 3 illustrates a diagram of a protection system 300 that may be executed by a combination of hardware (e.g., integrated circuits, such as comparators, logic gates, etc. of a control circuit, such as the control circuit 150 and/or the control circuit 250) and/or software (e.g., executed by a processor of a control circuit, such as the control circuit 150 and/or the control circuit 250) of a power supply (e.g., such as the power supply 100 and/or the power supply 200). The processor of the control circuit may comprise computer executable instructions (e.g., software and/or firmware) that are stored by the control circuit (e.g., stored by memory of the control circuit) that enable the control circuit to perform all or portions of the protection system 300. The protection system 300 may include both overload protection and component fault detection logic. In addition to the protection system 300, the power supply may include one or more hardware circuits that are configured to perform over-power protection (e.g., the over-power protection circuit 110 of FIG. 1 and/or the comparator 260 of the over-power protection circuit 210 of FIG. 2), for example, independent of the control circuit.

The protection system 300 may be responsive to a first feedback signal $V_{FB1}$ and an error signal $V_{ER}$, such as those described with reference to FIG. 1 and/or FIG. 2. The first feedback signal $V_{FB1}$ may indicate a magnitude of an input current $I_{IN}$ to a regulator circuit of the power supply (e.g., the regulator circuit 140 and/or the regulator circuit 240), while the error signal $V_{ER}$ may be indicative of a magnitude of a requested input power $P_{RQST}$ of the power supply (e.g., and may be determined based on a second feedback signal $V_{FB2}$).

The protection system 300 may receive the error signal $V_{ER}$ from an error-generation circuit (e.g., the error-generation circuit 160 and/or the error-generation circuit 270), for example, at an analog-to-digital converter (ADC) 310. The protection system 300 may receive the first feedback signal $V_{FB1}$ from the regulator circuit, for example, at an analog-to-digital converter (ADC) 320. The ADCs 310, 320 may be a hardware, software, or a combination of hardware and software. The ADCs 310, 320 may be implemented in those situations (e.g., only in those situations) where the protection system 300 needs to convert an analog signal to a digital signal. As such, although illustrated in a particular position in FIG. 3, in other examples the ADCs 310, 320 may be in different locations (e.g., in addition to or as an alternative to the illustrated positions) and/or may be omitted from the system 300.

In examples where a regulator circuit of the power supply includes one or more switching circuits (e.g., the regulator circuit 140 and/or the regulator circuit 240), the error signal $V_{ER}$ may indicate an operating period $T_{OP}$ of the one or more drive signals generated by the control circuit for controlling the switching circuits of the regulator circuit. In some examples, the control circuit may set a minimum operating period $T_{MIN}$ and a maximum operating period $T_{MAX}$ of the switching circuits, and the protection system 300 may apply a scaler 312 to the error signal $V_{ER}$ based on the minimum operating period $T_{MIN}$ and the maximum operating period $T_{MAX}$ (e.g., to convert the error signal $V_{ER}$ to an operating period). The protection system 300 may provide the scaled error signal $V_{ER}$ to a gate drive circuit 330, for example, so that the gate drive circuit may perform closed-loop gate control (e.g., as described herein). For example, the error signal $V_{ER}$ may be defined across a range between a minimum magnitude and a maximum magnitude, where the minimum magnitude of the error signal $V_{ER}$ may correspond with (e.g., map to) the minimum operating period $T_{MIN}$ and the maximum magnitude of the error signal $V_{ER}$ may correspond with (e.g., map to) the maximum operating period $T_{MAX}$. As such, the protection system 300 may apply the scaler 312 to the error signal $V_{ER}$ based on the minimum operating period $T_{MIN}$ and the maximum operating period $T_{MAX}$ (e.g., to convert the error signal $V_{ER}$ to an operating period $T_{OP}$). Further, in some examples, the gate drive circuit 330 may be an example of the gate drive circuit 114 and/or the gate drive circuit 214.

In some examples the error signal $V_{ER}$ may indicate the operating period Top and/or the frequency fop of the one or more switching circuits of the regulator circuit (e.g., the operating period $T_{OP}$ and/or the operating frequency fop of the one or more drive signals). For example, the power supply may be configured such that the switching circuits of the regulator circuit may be driven between the minimum operating period $T_{MIN}$ and the maximum operating period $T_{MAX}$. In such examples, the protection system 300 may apply a scaler 312 to the error signal $V_{ER}$ based on the minimum operating period $T_{MIN}$ and the maximum operating period $T_{MAX}$, such that the scaled error signal $V_{ER}$ may be indicative of an operating period of the one or more switching circuits of the regulator circuit.

The protection system 300 may apply an averaging filter 314 to the scaled error signal $V_{ER}$, for example to generate a requested input power $P_{RQST}$ of the regulator circuit. For example, the protection system 300 may also a filter to the scaled error signal $V_{ER}$ to reduce or prevent the impact of transients on the error signal $V_{ER}$. In some instance, the filter (e.g., a time constant of the filter) may be set to 200 ms. In some examples, the requested input power $P_{RQST}$ may be indicative of an operating period of the one or more switching circuits of the regulator circuit. Further, as noted above, the requested input power $P_{RQST}$ may represent an amount of power to which the input current $I_{IN}$ of the regulator circuit may be adjusted as the control circuit controls the regulator circuit to generate the output voltage $V_{OUT}$ at the output current $I_{OUT}$.

A comparator 316 may compare the requested input power $P_{RQST}$ (e.g., which may be indicative of an operating period of the one or more switching circuits of the regulator circuit) to a threshold. In the system 300, the threshold is defined in terms of a mid-operating period $T_{MID}$. The threshold (e.g., the mid-operating period $T_{MID}$) may be determined such that the operating period indicated by the magnitude of the requested input power $P_{RQST}$ is configured to exceed the second threshold whenever the power supply is delivering power to an electrical load during normal operation. Accordingly, in some examples the error signal $V_{ER}$ may be scaled based on the minimum operating period $T_{MIN}$ and a maximum operating period $T_{MAX}$ of the switching circuits and then applied to an averaging filter, such that the result, the requested input power $P_{RQST}$, indicates a period $T_{RQST}$ and the second threshold may indicate a period threshold (e.g., the mid-operating period $T_{MID}$). If the period $T_{RQST}$ indicated by the requested input power $P_{RQST}$ is greater than the second threshold (e.g., if the period indicated by the requested input power $T_{RQST} > T_{MID}$), the comparator 316 may drive its output high (e.g., to a logic "1" level), which may be received a first input of an AND gate 318. Accordingly, the protection system 300 may provide a signal to a first input of an AND gate 318 when the requested input power $P_{RQST}$ indicates that the power supply is providing power to an electrical load. Therefore, the mid-operating period $T_{MID}$ may be set such that the period $T_{RQST}$ indicated by the requested input power $P_{RQST}$ exceeds the mid-operating period T-MID when the power supply is providing power to an electrical load during normal operation. That is, the mid-operating period $T_{MID}$ may mapped to the magnitude of the error signal $V_{ER}$ that is expected during normal operation.

As described herein, the power supply may also regulate the output power $V_{OUT}$ based on the error signal $V_{ER}$. For example, the power supply may perform closed-loop gate drive control at the gate drive circuit 330 based on the error signal $V_{ER}$ (e.g., the gate drive circuit 330 may use the error signal $V_{ER}$ to control the control one or more gate drive signals to control the magnitude of the output voltage $V_{OUT}$). For example, the power supply may use the error signal $V_{ER}$ as feedback to ensure that the operating period and frequency of the drive signals to control the output voltage $V_{OUT}$ to a desired, constant output voltage $V_{OUT}$.

The protection system 300 may receive the first feedback signal $V_{FB1}$ from the regulator circuit. As noted above, in some examples, the protection system 300 may generate a digital version of the first feedback signal $V_{FB1}$ using the 320. The protection system 300 may apply an averaging filter 322 to the first feedback signal $V_{FB1}$ to generate a filtered first feedback signal $V_{FB1}$, for example, to reduce or prevent the impact of transients on the first feedback signal $V_{FB1}$. As noted herein, the first feedback signal may be indicative of an input power $P_{IN}$ to the regulator circuit of the power supply.

The protection system 300 may compare the input power $P_{IN}$ (e.g., indicated by the first feedback signal $V_{FB1}$) to a first threshold (e.g., the power-limit threshold $P_{TH-PL}$) and to a third threshold (e.g., the low power threshold $P_{TH-LO}$). For example, a comparator 324 may compare the input power $P_{IN}$ (e.g., indicated by the first feedback signal $V_{FB1}$) to the power-limit threshold $P_{TH-PL}$. As noted herein, the power-limit threshold $P_{TH-PL}$ may indicate a maximum power threshold for the power supply, for example, as defined by UL standards for power supplies, such as Class 2 power supplies (e.g., in the range of 95-100 watts).

If the input power $P_{IN}$ is greater than the power-limit threshold $P_{TH-PL}$, the comparator 324 may drive its output high (e.g., to a logic "1" level), which may be received by an input of an OR gate 328. If the OR gate 328 receives a logic "1" level at either input, the OR gate 328 may drive its output high (e.g., to a logic "1" level), which may be received by the gate drive circuit 320 to cause the gate drive circuit 320 to shut down the power supply. For example, the override signal $V_{OR}$ may be example of the output of the OR gate 328. Accordingly, the protection system 300 may disable the power supply if the input power $P_{IN}$ exceeds the power-limit threshold $P_{TH-PL}$. For example, in in response to the input power $P_{IN}$ exceeding the power-limit threshold $P_{TH-PL}$, the protection system 300 may control one or more gate drive signals, via the gate drive circuit 320, to control the magnitude of the output voltage to be approximately zero volts. As such, the protection system 300 may be configured to detect an overload condition and cause shut down the power supply in response to a detection of an overload condition.

The protection system 300 may compare the input power $P_{IN}$ (e.g., indicated by the first feedback signal $V_{FB1}$) to the third threshold (e.g., the low power threshold $P_{TH-LO}$). The low power threshold $P_{TH-LO}$ may be less than the power-limit threshold $P_{TH-PL}$. In some examples, the low power threshold $P_{TH-LO}$ may be approximately 10 watts. The low power threshold $P_{TH-LO}$ may be set such that the magnitude of the input power $P_{IN}$ is greater than the low power threshold $P_{TH-LO}$ when the power supply 100 is providing output power $P_{OUT}$ during normal operation, and such that the magnitude of the input power $P_{IN}$ is less than the low power threshold $P_{TH-LO}$ when the power supply 100 is not providing output power $P_{OUT}$ during normal operation.

If the comparator 326 determines that the input power $P_{IN}$ is less than the low power threshold $P_{TH-LO}$, the comparator 326 may drive its output high (e.g., to a logic "1" level), which may be received by a second input of the AND gate 318. Therefore, the comparator 326 may drive its output high when the input power $P_{IN}$ indicates that the power supply 100 is not providing output power $P_{OUT}$ during normal operation. If the AND gate 318 receives logic "1" levels from both the comparator 316 and the comparator 326, the AND gate 318 may drive its output high (e.g., to a logic "1" level), which may be received by the OR gate 328. As noted above, if the OR gate 328 receives a logic "1" level at either input, the OR gate 328 may drive its output high (e.g., to a logic "1" level) to cause the gate drive circuit 320 to shut down the power supply.

So, if the protection system 300 determines that the input power $P_{IN}$ is less than the low power threshold $P_{TH-LO}$ and the requested input power $P_{RQST}$ is greater than the second threshold (e.g., if the period indicated by the requested input power $P_{RQST} > T_{MID}$), the AND gate 318 may receive logic "1" levels at both inputs, and in response, drive its output high (e.g., to a logic "1" level), to cause the OR gate 328 to drive its output high (e.g., to a logic "1" level), to cause the power supply to shut down. Such instances may be indicative of a fault occurring somewhere in the power supply (e.g., a component fault), because for example, the input power $P_{IN}$ is indicating that the power supply is not providing output power during normal operation, but the requested input power $P_{RQST}$ is indicating that the load is drawing current from the power supply. As such, the protection system 300 may infer that at last one component of the power supply is faulted (e.g., open or shorted closed), and in response, cause the power supply to shut down (e.g., cause the magnitude of the output voltage $V_{OUT}$ to be approximately zero volts).

The comparison performed at any of 316, 324, 326 could be implemented by comparators or by software of the control circuit. Further the AND gate could be performed by an analog AND logic gate or by software of the control circuit. Similarly, the OR gate could be performed by an analog OR logic gate or by software of the control circuit.

Figure 4:
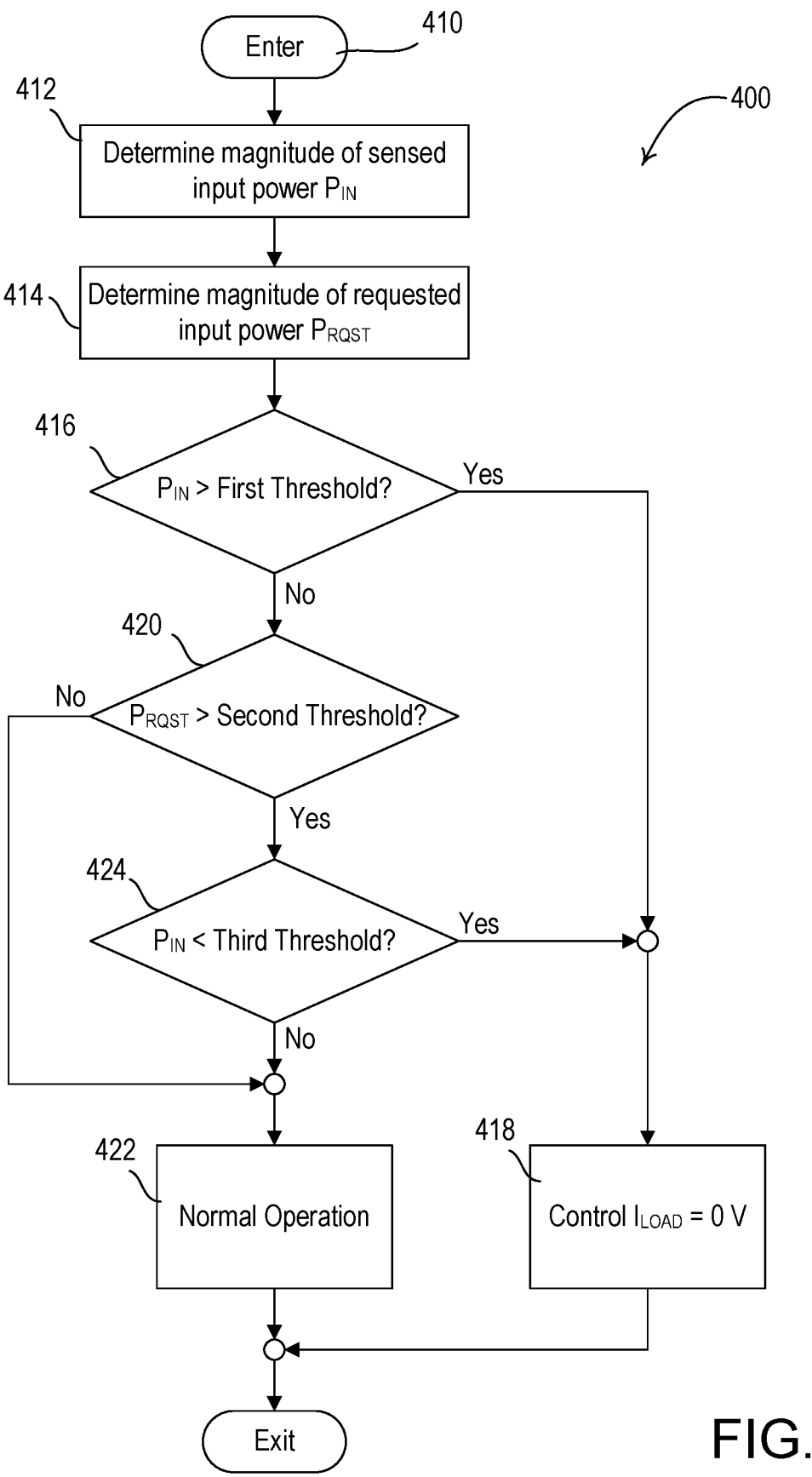
FIG. 4 illustrates a flowchart of redundant protection procedure that may be enabled by a control circuit of a power supply.

FIG. 4 illustrates a flowchart of a protection procedure 400 that may be executed by a control circuit of a power supply, such as the control circuit 150 of the power supply 100 of FIG. 1 and/or the control circuit 250 of the power supply 200 shown in FIG. 2. The control circuit may comprise computer executable instructions (e.g., software and/or firmware) that are stored by the control circuit (e.g., stored by memory of the control circuit) that enable the control circuit to perform the protection procedure 400. The protection procedure 400 may include both overload protection and fault detection logic. The power supply may include the control circuit that is configured to perform the protection procedure 400 in addition to one or more hardware circuits that are configured to perform over-power protection (e.g., the over-power protection circuit 110 of FIG. 1 and/or the over-power protection circuit 210 of FIG.

2), for example, independent of the control circuit. The control circuit may perform the protection procedure 400 periodically.

The control circuit may begin the procedure 400 at 410. The control circuit may determine a magnitude of an input power $P_{IN}$ at 412. For example, the control circuit may receive a first signal that may be indicative of the input current $I_{IN}$ of a regulator circuit of the power supply (e.g., the regulator circuit 140, 240). In some examples, the first signal may be a feedback signal that is indicative of the magnitude of the input current $I_{IN}$, such as the first feedback signal $V_{FB1}$ described with reference to FIGS. 1 and/or 2. In some examples, the control circuit may receive the first signal from the regulator circuit (e.g., a half-bridge inverter circuit), such as in response to a sense current conducted through a sense resistor $R_{SENSE}$ that is in series with a low-side FET of a half-bridge inverter circuit of the regulator circuit.

The control circuit may be configured to determine a magnitude of a requested input power $P_{RQST}$ at 414. For example, the control circuit may receive a signal that is indicative of the magnitude of the requested input power $P_{RQST}$, such as the error signal $V_{ER}$ as described with reference to FIGS. 1 and/or 2, and determine the requested input power $P_{RQST}$ from the signal. For example, the control circuit may receive the error signal $V_{ER}$ (e.g., which may be indicative of the magnitude of the requested input power $P_{RQST}$) from an error-generation circuit (e.g., the error-generation circuit 160 and/or the error-generation circuit 260). The error-generation circuit may have generated the error signal $V_{ER}$ based on a feedback signal that is generated on the secondary side of a transformer of the regulator circuit (e.g., the second feedback signal $V_{FB2}$) and a signal (e.g., the target voltage $V_{TRGT}$) received from the control circuit that indicates a target magnitude $V_{OUT\text{-}TRGT}$ of the output voltage $V_{OUT}$ of the power supply, for example, when the power supply is a constant-voltage power supply. The error signal $V_{ER}$ may indicate a difference between the actual output voltage $V_{OUT}$ (e.g., based on the second feedback signal $V_{FB2}$) and a target magnitude $V_{TRGT}$ of the output voltage $V_{OUT}$. The target magnitude $V_{TRGT}$ of the output voltage $V_{OUT}$ may indicate the desired magnitude of the output voltage $V_{OUT}$, which may be based on the constant-voltage rating of the power supply 100. Further, it should be appreciated that the control circuit may also use the error signal $V_{ER}$ to regulate the output power $V_{OUT}$ (e.g., the control circuit 150 may perform closed-loop gate drive control based on the error signal $V_{ER}$).

At 416, the control circuit may compare the magnitude of the input power $P_{IN}$ to a first threshold, such as the power-limit threshold $P_{TH\text{-}PL}$. The first threshold may indicate a maximum power threshold for the power supply, for example, as defined by UL standards for power supplies, such as Class 2 power supplies (e.g., 95-100 watts). The first threshold may be indicative of an overload condition (e.g., an over-power and/or an over-current condition). In some examples, the overload condition may be caused by a fault in the load that is coupled to the output terminals (e.g., the output terminals 196a 196b) of the power supply.

If the control circuit determines that the magnitude of the input power $P_{IN}$ exceeds the first threshold (e.g., the power-limit threshold $P_{TH\text{-}PL}$) at 416, the control circuit may control the regulator circuit (e.g., via a gate drive circuit) to control the magnitude of the output voltage to be approximately zero volts at 418, and the protection procedure 400 may exit. As such, the protection procedure 400 may be configured to cause the control circuit to control the magnitude of the output voltage to be approximately zero volts to prevent an overload (e.g., over-current condition) at the power supply. Further, in some examples, the power supply may also include an over-power protection circuit (e.g., the over-power protection circuit 110 and/or the over-power protection circuit 210) that may compare the magnitude of the first feedback signal $V_{FB1}$ (e.g., which may be indicative of the input power $P_{IN}$) to a power-limit threshold voltage $V_{TH\text{-}PL}$ (e.g., which, similar to the first threshold, may be indicative of the maximum power threshold for the power supply), and cause the power supply to shut down if an overload condition is detected.

In some examples, the regulator circuit may include one or more switching circuits and the power supply may include a gate drive circuit (e.g., the gate drive circuit 114 and/or the gate drive circuit 214) that is configured to provide one or more drive signals to the switching circuit to render the switching circuit conductive and non-conductive. In such examples and in response to the magnitude of the input power $P_{IN}$ exceeding the first threshold (e.g., the power-limit threshold $P_{TH\text{-}PL}$) at 416, the control circuit may control the one or more gate drive signals to control the magnitude of the output voltage to be approximately zero volts at 418.

If the control circuit determines that the magnitude of the input power $P_{IN}$ does not exceed the first threshold at 416, the control circuit may compare the magnitude of the requested input power $P_{RQST}$ to a second threshold, such as the requested-power threshold $P_{TH\text{-}RQST}$, at 420. The second threshold may be configured such that the magnitude of the requested input power $P_{RQST}$ is configured to exceed the second threshold whenever the electrical load is drawing current. If the control circuit determines that the magnitude of the requested input power $P_{RQST}$ is not greater than the second threshold at 420, the control circuit may continue to operate in a normal mode of operation at 422. Accordingly, if the feedback from the secondary side of the transformer (e.g., the error signal $V_{ER}$ and/or the requested input power $P_{RQST}$) indicates that the electrical load is not drawing current, the control circuit may continue to operate in a normal mode of operation at 422. In some examples, the steps 420 and 424 may be reversed. Alternatively or additionally, in some examples, the step 416 may be omitted from the protection procedure 400 such that the control circuit may transition from 414 directly to 420.

If, however, the control circuit determines that the magnitude of the requested input power $P_{RQST}$ is greater than the second threshold at 420, then the control circuit may compare the magnitude of the input power $P_{IN}$ to a third threshold (e.g., the low power threshold $P_{TH\text{-}LO}$) at 424.

The third threshold may be less than the first threshold. In some examples, the third threshold may be approximately 10 watts. The third threshold may be configured such that the magnitude of the input power $P_{IN}$ is greater than the third threshold when the power supply 100 is providing output power $P_{OUT}$ during normal operation, and such that the magnitude of the input power $P_{IN}$ is less than the third threshold when the power supply 100 is not providing output power $P_{OUT}$ during normal operation.

If the control circuit determines that the magnitude of the input power $P_{IN}$ is greater than the third threshold at 424, the control circuit may continue to operate in a normal mode of operation at 422. That is, when the magnitude of the requested input power $P_{RQST}$ indicates that the electrical load is drawing current and the magnitude of the input power $P_{IN}$ indicates that the power supply 100 is providing output power $P_{OUT}$ during normal operation, the control circuit may continue to operate in a normal mode of operation at 422. For example, the control circuit may be configured to control the regulator circuit to provide the output current $I_{OUT}$ from the power supply in accordance with a normal mode of operation of the power supply.

If, however, the control circuit determines that the magnitude of the input power $P_{IN}$ is less than the third threshold at 424, the control circuit may control regulator circuit to control the magnitude of the output voltage to be approximately zero volts at 418, and the protection procedure 400 may exit. For example, if the magnitude of the input power $P_{IN}$ is less than the third threshold but the magnitude of the requested input power $P_{RQST}$ is greater than the second threshold, the control circuit may control the one or more gate drive signals to control the magnitude of the output voltage to be approximately zero volts. In such instances, the magnitude of the input power $P_{IN}$ may indicate that the regulator circuit is not drawing power from the bus voltage $V_{BUS}$, but the magnitude of the requested input power $P_{RQST}$ may indicate that the power supply is attempting to generate the output voltage $V_{OUT}$, which may indicate a fault condition in the feedback circuitry of the power supply. As such, the control circuit may determine (e.g., infer) that one or more components of the power supply are faulted (e.g., open or shorted closed), and in response, control the magnitude of the output voltage $V_{OUT}$ to be approximately zero volts. As such, even in the event that a hardware-based over-power protection circuit of the power supply were to fail to recognize and trip in an over-power event (e.g., the first feedback signal $V_{FB1}$ is unreliable), the control circuit would still be able to detect a fault condition (e.g., such as an overload condition and/or a component fault) and cause the power supply to shut down (e.g., cause the magnitude of the output voltage $V_{OUT}$ to be approximately zero volts). Finally, the combination of 420 and 424 may be similar to that performed by the AND gate 318 of FIG. 3.

Figure 5:
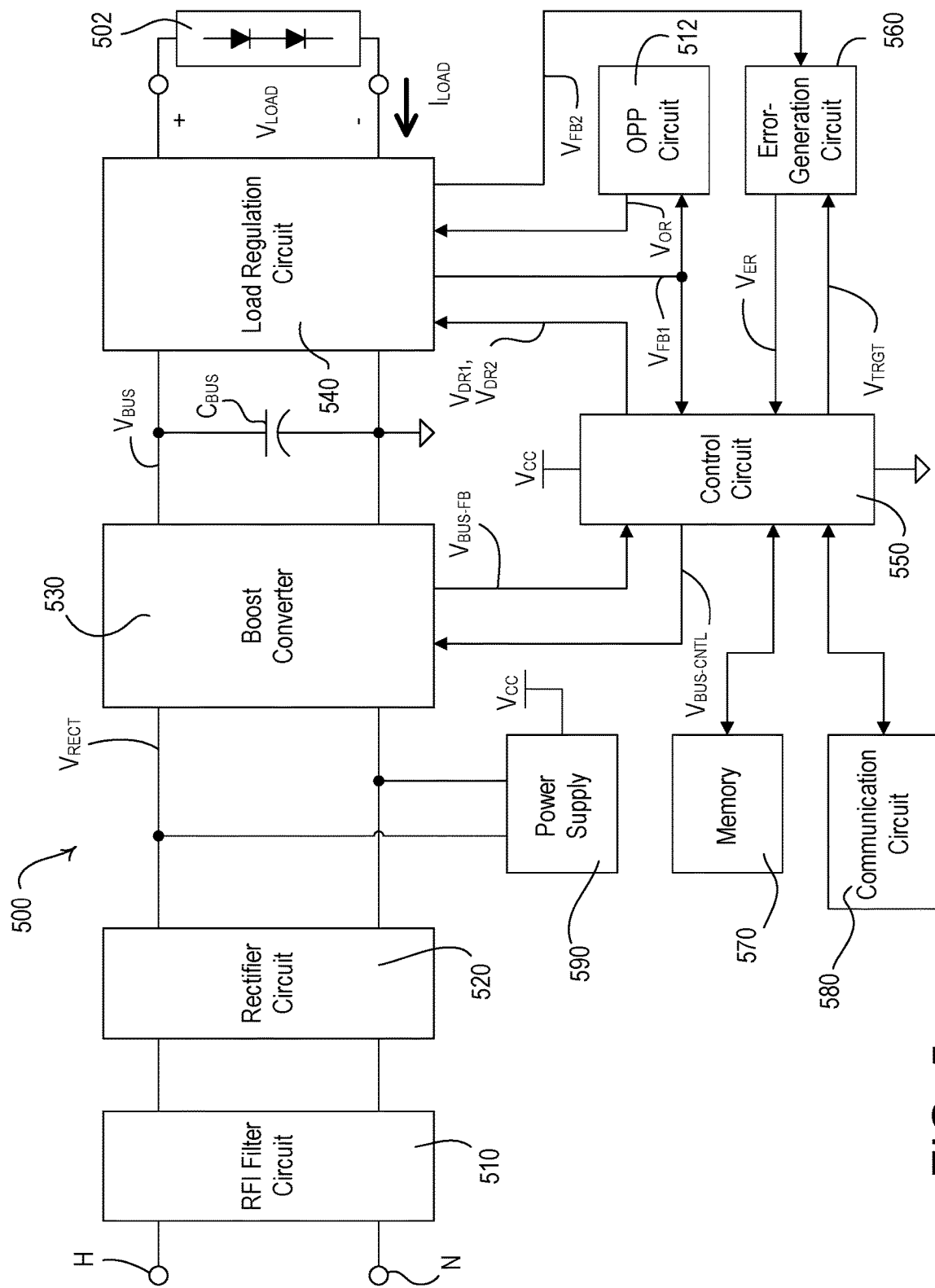
FIG. 5 is a simplified block diagram of an example control device for controlling the amount of power delivered to an electrical load.

FIG. 5 is a simplified block diagram of an example load control device, e.g., a light-emitting diode (LED) driver 500, for controlling the amount of power delivered to an electrical load, such as, an LED light source 502 (e.g., an LED light engine), and thus the intensity of the light source. The LED light source 502 is shown as a plurality of LEDs connected in series but may comprise a single LED or a plurality of LEDs connected in parallel or a suitable combination thereof, depending on the particular lighting system. The LED light source 502 may comprise one or more organic light-emitting diodes (OLEDs). The LED driver 500 may comprise a hot terminal H and a neutral terminal that are adapted to be coupled to an alternating-current (AC) power source (not shown). The LED driver 500 may be an example of a power supply, such as the power supply 100 of FIG. 1.

The LED driver 500 may comprise a radio-frequency interference (RFI) filter circuit 510, a rectifier circuit 520, a boost converter circuit 530, a load regulation circuit 540, a control circuit 550, an error-generation circuit 560, a memory 570, a communication circuit 580, and/or a power supply 590. The RFI filter circuit 510 may minimize the noise provided on the AC mains. The rectifier circuit 520 may generate a rectified voltage $V_{RECT}$. The boost converter 530 may receive the rectified voltage $V_{RECT}$ and generate a boosted direct-current (DC) bus voltage $V_{BUS}$ across a bus capacitor $C_{BUS}$. The boost converter circuit 530 may comprise any suitable power converter circuit for generating an appropriate bus voltage, such as, for example, a flyback converter, a single-ended primary-inductor converter (SEPIC), a Ćuk converter, or other suitable power converter circuit. The boost converter circuit 530 may operate as a power factor correction (PFC) circuit to adjust the power factor of the LED driver 500 towards a power factor of one. The rectifier circuit 520 and the boost converter circuit 530 may be similar to the rectifier circuit and the boost converter circuit, respectively, of the AC-to-DC converter circuit 130 of FIG. 1.

The load regulation circuit 540 may receive the bus voltage $V_{BUS}$ and control the amount of power delivered to the LED light source 502 across a power range. For example, the load regulation circuit may control the intensity of the LED light source 502 between a low-end (e.g., minimum) intensity $L_{LE}$ (e.g., approximately 0.1-5%) and a high-end (e.g., maximum) intensity $L_{HE}$ (e.g., approximately 100%). An example of the load regulation circuit 540 may be an isolated, half-bridge forward converter circuit. An example of the load control device (e.g., LED driver 500) comprising a forward converter is described in greater detail in commonly-assigned U.S. Pat. No. 9,253,829, filed Feb. 2, 2016, entitled LOAD CONTROL DEVICE FOR A LIGHT-EMITTING DIODE LIGHT SOURCE, the entire disclosure of which is hereby incorporated by reference. The load regulation circuit 540 may also comprise, for example, a buck converter, a linear regulator, or any suitable LED drive circuit for adjusting the intensity of the LED light source 502. The load regulation circuit 540 may be an example of a regulator circuit, such as the regulator circuit 140 of the power supply 100 of FIG. 1.

The control circuit 550 may be configured to control the operation of the boost converter circuit 530 and/or the load regulation circuit 540. An example of the control circuit 550 may be a controller. The control circuit 550 may comprise, for example, a digital controller or any other suitable processing device, such as, for example, a microcontroller, a programmable logic device (PLD), a microprocessor, an application specific integrated circuit (ASIC), or a field-programmable gate array (FPGA). The control circuit 550 may generate a bus voltage control signal $V_{BUS-CNTL}$, which may be provided to the boost converter circuit 530 for adjusting the magnitude of the bus voltage $V_{BUS}$. The control circuit 550 may receive a bus voltage feedback signal $V_{BUS-FB}$ from the boost converter circuit 530, which may indicate the magnitude of the bus voltage $V_{BUS}$.

The control circuit 550 may generate at least one drive signal such as drive signals $V_{DR1}$, $V_{DR2}$. The drive signals $V_{DR1}$, $V_{DR2}$ may be provided to the load regulation circuit 540 for adjusting the magnitude of a load voltage $V_{LOAD}$ generated across the LED light source 502 and/or the magnitude of a load current LOAD conducted through the LED light source 520, for example, to control the intensity of the LED light source 520 to a target intensity $L_{TRGT}$, which may range from the low-end intensity $L_{LE}$ to the high-end intensity $L_{HE}$. The control circuit 550 may adjust an operating frequency $f_{OP}$ and/or a duty cycle $DC_{INV}$ (e.g., an on-time $T_{ON}$) of the drive signals $V_{DR1}$, $V_{DR2}$ to adjust the magnitude of the load voltage $V_{LOAD}$ and/or the load current $I_{LOAD}$.

The control circuit 550 may receive one or more feedback signals from the load regulation circuit 540. For example, the load regulation circuit 540 may generate first feedback signal $V_{FB1}$ and an error signal $V_{ER}$ (e.g., which may be determined via a feedback signal $V_{FB2}$). The control circuit 550 may receive the first feedback signal $V_{FB1}$ from the load regulation circuit 540 and may be configured to determine a magnitude of an input power $P_{IN}$ of the load regulation circuit 540 based on the bus voltage feedback signal $V_{BUS-FB}$ and the first feedback signal $V_{FB1}$.

The LED driver 500 may also comprise an error-generation circuit 560 that receives the second feedback signal $V_{FB2}$. The error-generation circuit 560 may be similar to the error-generation circuit 160 and/or the error-generation circuit 260. The error-generation circuit 560 may receive a second feedback signal $V_{FB2}$ from the load regulation circuit 540 and a target voltage $V_{TRGT}$ from the control circuit 550. The second feedback signal $V_{FB2}$ may be indicative of the magnitude of the load voltage $V_{LOAD}$ and/or the magnitude of the load current $I_{LOAD}$ of the LED driver 500. For example, the error-generation circuit 560 may be coupled across the load voltage $V_{LOAD}$ for measuring the magnitude of the load voltage $V_{LOAD}$ and/or in series with the load current $I_{LOAD}$ for measuring the magnitude of the load current $I_{LOAD}$. In some instances, the error-generation circuit 560 may comprise an optocoupler, where an emitter (e.g., photoemitter) of the optocoupler is located within the load regulation circuit 540 on a secondary side of a transformer and a receiver (e.g., photosensor) of the optocoupler is configured to generate the second feedback signal $V_{FB2}$.

The error-generation circuit 560 may receive the target voltage $V_{TRGT}$ from the control circuit 550. The magnitude of the target voltage $V_{TRGT}$ may indicate a target load voltage $V_{LOAD-TRGT}$ and/or a target load current $I_{LOAD-TRGT}$ of the LED driver 500. Accordingly, the target load voltage $V_{LOAD-TRGT}$ may indicate a desired magnitude of the load voltage $V_{LOAD}$ and the target load current $I_{LOAD-TRGT}$ may indicate a desired magnitude of the output current $I_{LOAD}$.

The error-generation circuit 560 may generate an error signal $V_{ER}$ and provide the error signal $V_{ER}$ to the control circuit 550. The error-generation circuit 560 may be configured to generate the error signal $V_{ER}$ based on the second feedback signal $V_{FB2}$ and target voltage $V_{TRGT}$. The error signal $V_{ER}$ may be indicative of the magnitude of a requested input power $P_{RQST}$ of the LED driver 500. For example, the requested input power $P_{RQST}$ may represent the amount of power that needs to be drawn from the bus voltage $V_{BUS}$ to generate the load voltage $V_{LOAD}$ at the target load voltage $V_{LOAD-TRGT}$ and/or generate the load current $I_{LOAD}$ at the target load current $I_{LOAD-TRGT}$. The requested input power $P_{RQST}$ may represent an amount of power to which the input current $I_{IN}$ of the load regulation circuit 540 may be adjusted as the control circuit 550 controls the load regulation circuit 540 to generate the load voltage $V_{LOAD}$ at the target load voltage $V_{LOAD-TRGT}$ and/or generate the load current $I_{LOAD}$ at the target load current $I_{LOAD-TRGT}$. Further, the error signal $V_{ER}$ may be indicative of the difference between the actual load voltage $V_{LOAD}$ (e.g., based on the second feedback signal $V_{FB2}$) and the target load voltage $V_{LOAD-TRGT}$, and/or between the actual load current $I_{LOAD}$ (e.g., based on the second feedback signal $V_{FB2}$) and the target load current $I_{LOAD-TRGT}$. The target load voltage $V_{LOAD-TRGT}$ may indicate the desired magnitude of the load voltage $V_{LOAD}$ and the target load current $I_{LOAD-TRGT}$ may indicate the desired magnitude of the load current $I_{LOAD}$. In some examples, the error-generation circuit 560 may comprise a proportional-integral-derivative (PID) controller, and the error signal $V_{ER}$ may be indicative of the integration/accumulation of difference between the target voltage $V_{TRGT}$ and the output voltage $V_{OUT}$ over time.

The control circuit 550 may regulate the load voltage $V_{LOAD}$ and/or the load current $I_{LOAD}$ based on the error signal $V_{ER}$. For example, the control circuit 550 may perform closed-loop gate drive control based on the error signal $V_{ER}$. The control circuit 550 may control the magnitude of the load voltage $V_{LOAD}$ and/or the magnitude of the load current $I_{LOAD}$ based on the error signal $V_{ER}$. For example, the control circuit 550 may control the drive signals $V_{DR1}$, $V_{DR2}$ to adjust the magnitude of the load voltage $V_{LOAD}$ to the target load voltage $V_{LOAD-TRGT}$ to control the amount of power delivered to the electrical load (e.g., to control the intensity of the LED light source 502 to the target intensity $L_{TRGT}$) in response to the error signal $V_{ER}$ (e.g., using a control loop). Alternatively or additionally, the control circuit 550 may control the drive signals $V_{DR1}$, $V_{DR2}$ to adjust the magnitude of the load current $I_{LOAD}$ to the target load current $I_{LOAD-TRGT}$ to control the amount of power delivered to the electrical load (e.g., to control the intensity of the LED light source 502 to the target intensity $L_{TRGT}$) in response to the error signal $V_{ER}$ (e.g., using a control loop).

Although not illustrated, the LED driver 500 may include a gate drive circuit, which may generate the drive signals $V_{DR1}$, $V_{DR2}$ for controlling the load regulation circuit 540, such as the gate drive circuit 114 and/or the gate drive circuit 214. In some examples, the gate drive circuit may be part of the load regulation circuit 540.

The LED driver 500 may include an over-power protection circuit 512 (e.g., the over-power protection circuit 110 and/or the over-power protection circuit 210) that is configured to determine an over-power condition, and in response, cause the LED driver 500 to control the magnitude of the load voltage $V_{LOAD}$ to approximately zero volts and/or control the magnitude of the load current $I_{LOAD}$ to approximately zero amps. The over-power protection circuit 512 may be configured to receive the first feedback signal $V_{FB1}$ indicative of the magnitude of the input current $I_{IN}$ of the load regulation circuit 540. For example, the load regulation circuit 540 may comprise a sense resistor (e.g., sense resistor $R_{SENSE}$ shown in FIG. 6) in series with a switching circuit of the load regulation circuit 540 (e.g., low-side FET Q612 of a half-bridge inverter circuit shown in FIG. 6), and the over-power protection circuit 512 may receive the first feedback signal $V_{FB1}$, which may be indicative of a magnitude of a sense current $I_{SENSE}$ conducted through the sense resistor $R_{SENSE}$. The over-power protection circuit 512 may be configured to cause the magnitude of the load voltage $V_{LOAD}$ to be approximately zero volts and/or control the magnitude of the load current $I_{LOAD}$ to approximately zero amps when the magnitude of the input power $P_{IN}$ exceeds a threshold, such as a power-limit threshold $P_{TH-PL}$ (e.g., a maximum power threshold $P_{MAX}$), for example, by providing an override signal $V_{OR}$ to the load regulation circuit 540.

The control circuit 550 may be coupled to the memory 570. The memory 570 may store one or more thresholds and/or operational characteristics of the LED driver 500 (e.g., the target intensity $L_{TRGT}$, the low-end intensity $L_{LE}$, the high-end intensity $L_{HE}$, the first, second, and/or third thresholds, computer executable instructions for performing the procedures described herein, etc.). The memory 570 may be implemented as an external integrated circuit (IC) or as an internal circuit of the control circuit 550. The memory 570 may comprise a computer-readable storage media or machine-readable storage media that maintains computer-executable instructions for performing one or more procedure and/or functions as described herein. For example, the memory 570 may comprise computer-executable instructions or machine-readable instructions that when executed by the control circuit configure the control circuit to provide one or more portions of the procedures described herein. The control circuit 550 may access the instructions from memory 570 for being executed to cause the control circuit 550 to operate as described herein, or to operate one or more other devices as described herein. The memory 570 may comprise computer-executable instructions for executing configuration software. For example, the one or more thresholds and/or operational characteristics stored in the memory 570 may be configured during a configuration procedure of the LED driver 500.

The communication circuit 580 may enable communication via, for example, a wired communication link or a wireless communication link, such as a radio-frequency (RF) communication link or an infrared (IR) communication link. The control circuit 550 may be configured to communicate (e.g., transmit and/or receive) communication signals, e.g., wired communication signals and/or wireless communication signals, such as RF signals, via the communication circuit 580. The communication circuit 580 may comprise, for example, an RF transceiver, an RF receiver, an RF transmitter, an infrared (IR) receiver, and/or other suitable wireless communication circuit. The control circuit 550 may be configured to communicate messages (e.g., digital messages) with external devices via the communication circuit 580. In addition, the control circuit 550 may be configured to update the thresholds and/or the operational characteristics stored in the memory 570 in response to messages (e.g., digital messages) received via the communication circuit 580.

Figure 6:
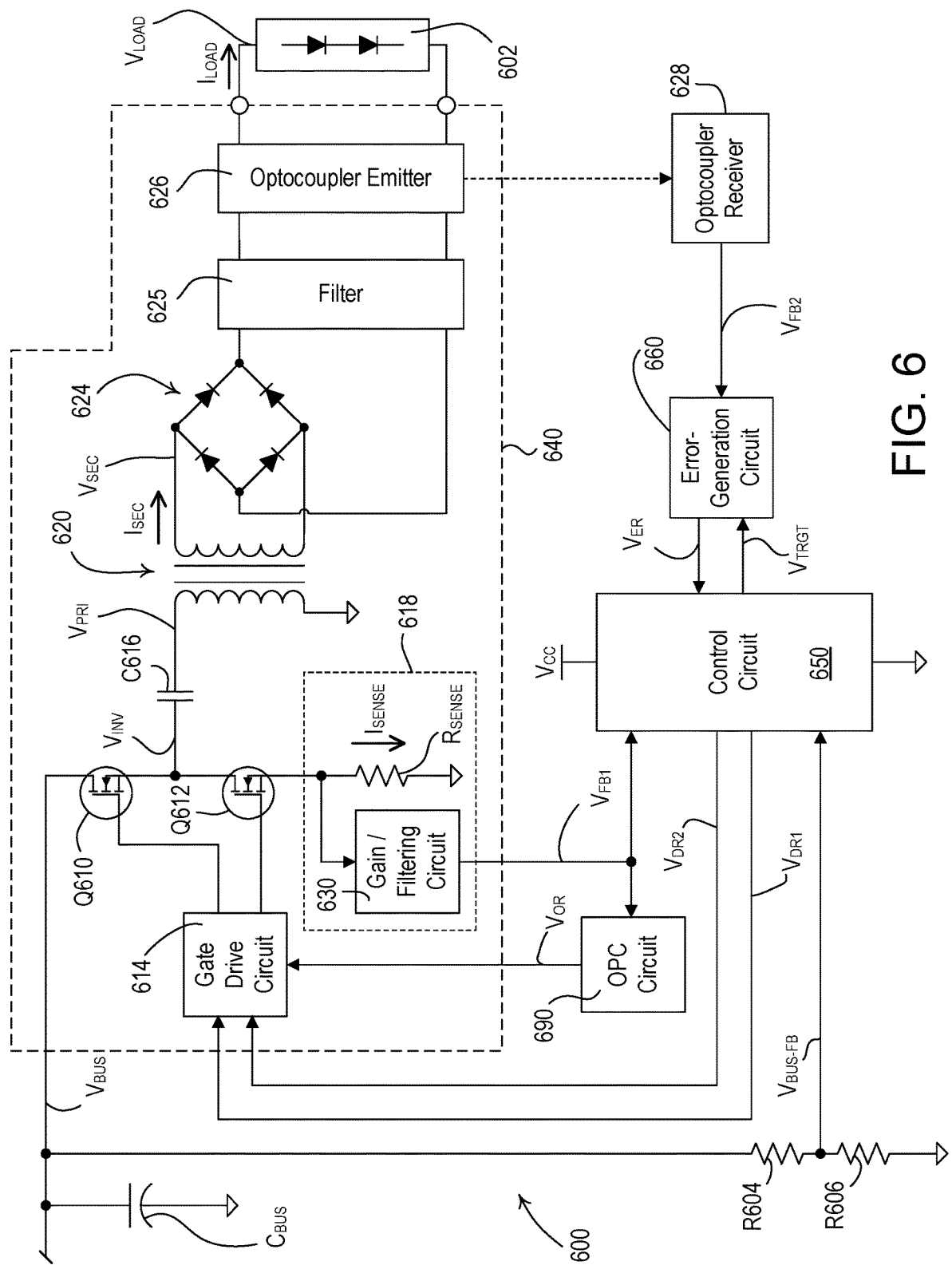
FIG. 6 is a simplified schematic diagram of a forward converter of an example LED driver.

FIG. 6 is a simplified schematic diagram of a forward converter circuit 640 of an example LED driver 600. The forward converter circuit 640 may be an example of the regulator circuit 140 of the power supply 100 of FIG. 1, the regulator circuit 240 of the power supply 200, and/or an example of the load regulation circuit 540 that may be implemented in the LED driver 500 shown in FIG. 5. Although described as controlling an amount of power delivered to an LED light source 602, the forward converter circuit 640 may be used to control the amount of power delivered to a different type of electrical load(s).

The LED driver 600 may include a control circuit 650 (e.g., the control circuit 150, the control circuit 250, and/or the control circuit 550) for controlling the forward converter circuit 640 to adjust a present intensity $L_{PRES}$ of the LED light source 602 in response to an error-generation circuit 660. The control circuit 650 may receive a bus voltage feedback signal $V_{BUS-FB}$ that may indicate a magnitude of a bus voltage $V_{BUS}$ received by the forward converter circuit 640. For example, the bus voltage feedback signal $V_{BUS-FB}$ may be generated by a resistive divider including resistors R604, R606.

As shown in FIG. 6, the forward converter circuit 640 may comprise a half-bridge inverter circuit including two field effect transistors (FETs) Q610, Q612 for generating a high-frequency inverter voltage $V_{INV}$ from the bus voltage $V_{BUS}$. The control circuit 650 may generate at least one drive signal (e.g., drive signals $V_{DR1}$, $V_{DR2}$) for rendering the FETs Q610, Q612 conductive and non-conductive. The drive signals $V_{DR1}$, $V_{DR2}$ may be coupled to gates of the respective FETs Q610, Q612 via a gate drive circuit 614. The gate drive circuit 614 may an example of the gate drive circuit 114 and/or the gate drive circuit 214. The forward converter circuit 640 may comprise a transformer 620 and the inverter voltage $V_{INV}$ may be coupled to the primary winding of the transformer 620 through a DC-blocking capacitor C616 (e.g., which may have a capacitance of approximately 0.047 μF), such that a primary voltage $V_{PR1}$ may be generated across the primary winding.

The control circuit 650 may be configured to pulse-width modulate (PWM) the drive signals $V_{DR1}$, $V_{DR2}$ to control the present intensity $L_{PRES}$ of the LED light source 602 towards a target intensity $L_{TRGT}$, which may range from the low-end intensity $L_{LE}$ to the high intensity $L_{HE}$. The control circuit 650 may be configured to adjust respective duty cycles $DC_1$, $DC_2$ of the drive signals $V_{DR1}$, $V_{DR2}$ to adjust the present intensity $L_{PRES,}$ for example, in response to the first feedback signal $V_{FB1}$, the second feedback signal $V_{FB2}$, and/or the bus voltage feedback signal $V_{BUS-FB}$.

The forward converter circuit 640 may comprise a current sense circuit 618, which may include a sense resistor $R_{SENSE}$ and a gain and filtering circuit 630. The sense resistor $R_{SENSE}$ may be coupled in series with the half-bridge inverter (e.g., in series with the first FET Q610 and the second FET Q612). The current sense circuit 618 may be similar to the current sense circuit 218 of FIG. 2. In addition, the gain and filtering circuit 630 may be similar to the gain and filtering circuit 230 shown in FIG. 2. The current sense circuit 618 may generate a first feedback signal $V_{FB1}$ in response to a sense current $I_{SENSE}$ conducted through the sense resistor $R_{SENSE}$ (e.g., conducted through the half-bridge inverter). The control circuit 650 may receive the first feedback signal $V_{FB1}$ and may be configured to determine the magnitude of the sense current $I_{SENSE}$ of the forward converter circuit 640 in response to the first feedback signal $V_{FB1}$. The control circuit 650 may use the magnitude of the sense current $I_{SENSE}$ to determine an input power $P_{IN}$ of the forward converter circuit 640. For example, the control circuit 650 may use the magnitude of the bus voltage $V_{BUS}$ (e.g., which may be determined from the bus voltage feedback signal $V_{BUS-FB}$ and/or stored in the memory 170) to calculate the input power PIN, (e.g., $P_{IN}=V_{BUS} \cdot I_{SENSE}$).

The secondary winding of the transformer 620 may generate a secondary voltage $V_{SEC}$ and may be coupled to the AC terminals of a rectifier bridge 624 (e.g., a full-wave diode rectifier bridge) for rectifying the secondary voltage generated across the secondary winding. The positive DC terminal of the rectifier bridge 624 may be coupled to the LED light source 602. The transformer 620 may provide electrical isolation between the line voltage input of the LED driver 600 (e.g., the hot terminal and the neutral terminal N) and the LED light source 602. The forward converter circuit 640 may also comprise a filter 625, such as a resonant circuit that includes an inductor and a capacitor connected together.

The forward converter circuit 640 may also comprise an optocoupler emitter 626 that is coupled across the load voltage $V_{LOAD}$ and/or in series with the load current $I_{LOAD}$. The optocoupler emitter 626 may be configured to generate a second feedback signal $V_{FB2}$ at an optocoupler receiver 628. The second feedback signal $V_{FB2}$ may be representative of an output power $P_{OUT}$ of the LED driver 600. For example, the second feedback signal $V_{FB2}$ may be representative of a magnitude of the load current $I_{LOAD}$ and/or a magnitude of the load voltage $V_{LOAD}$ of the LED light source 602.

The LED driver 600 may include an over-power protection circuit 690 (e.g., the over-power protection circuit 110 and/or the over-power protection circuit 210) that is configured to determine an overload condition, and in response, cause the LED driver 600 to control the magnitude of the load voltage $V_{LOAD}$ to approximately zero volts. The over-power protection circuit 690 may be configured to receive a first feedback signal $V_{FB1}$. The first feedback signal $V_{FB1}$ that may be indicative of the magnitude of a sense current $I_{SENSE}$ of the forward converter circuit 640 (e.g., when the LED driver 600 is a constant-voltage driver). The first feedback signal $V_{FB1}$ may be generated on the primary side of the transformer 620.

The over-power protection circuit 690 may be configured to disable the forward converter circuit 640 (e.g., cause the magnitude of the load voltage $V_{LOAD}$ to be approximately zero volts) based on the magnitude of the first feedback signal $V_{FB1}$. For example, the over-power protection circuit 690 may be configured to disable the forward converter circuit 640 when an input power $P_{IN}$ of the forward converter circuit 640 (e.g., based on the first feedback signal $V_{FB1}$) exceeds a threshold, such as a power-limit threshold $P_{TH-PL}$. The first feedback signal $V_{FB1}$ may be indicative of the sense current $I_{SENSE}$, and the sense current $I_{SENSE}$ may be indicative of the input power $P_{IN}$ (e.g., when the LED driver 600 is a constant-voltage power supply). Therefore, the over-power protection circuit 690 may be configured to disable the forward converter circuit 640 when the input power $P_{IN}$ (e.g., based on the first feedback signal $V_{FB1}$) exceeds the power-limit threshold $P_{TH-PL}$. As described in more detail herein, in some examples, the over-power protection circuit 690 may comprise analog circuitry.

The power-limit threshold $P_{TH-PL}$ may indicate a maximum power threshold for the LED driver 600, for example, as defined by standards developed by Underwriters Laboratories (UL) for power supplies, such as for Class 2 power supplies. In some examples, the power-limit threshold $P_{TH-PL}$ may be configured in the range of 95-100 watts. As such, the power-limit threshold $P_{TH-PL}$ may be indicative of an overload condition (e.g., an over-power and/or an over-current condition). An overload condition may be caused, for example, by a fault in the electrical load, such as the LED light source 602, that is coupled to the output terminal of the LED driver 600.

The over-power protection circuit 690 may generate an override signal $V_{OR}$ for controlling the gate drive circuit 614 to control the magnitude of the load voltage $V_{LOAD}$ (e.g., the output voltage $V_{OUT}$) to approximately zero volts in response to detecting an overload condition (e.g., when the magnitude of the input power $P_{IN}$ exceeds the power-limit threshold $P_{TH-PL}$). For example, in response to the magnitude of the input power $P_{IN}$ exceeding the power-limit threshold $P_{TH-PL}$ (e.g., based on the first feedback signal $V_{FB1}$), the over-power protection circuit 690 may provide the override signal $V_{OR}$ to the gate drive circuit 614, which may control one or more switching circuits of the forward converter 640 to operate such that the magnitude of the load voltage $V_{LOAD}$ is controlled to approximately zero volts. For example, the over-power protection circuit 690 may be configured to render the FET Q612 conductive and render the FET Q610 non-conductive to disable the LED driver 600 in response to detecting an over-power condition.

The control circuit 650 may receive one or more feedback signals from forward converter 640 (e.g., directly or indirectly from the forward converter 640). For example, the control circuit 650 may receive the first feedback signal $V_{FB1}$, and as discussed in more detail below, an error signal $V_{ER}$ that is generated based on a second feedback signal $V_{FB2}$. As noted above, the first feedback signal $V_{FB1}$ may be indicative of the magnitude of the sense current $I_{SENSE}$ of the forward converter circuit 640. In some examples, the control circuit 650 may be configured to determine a magnitude of the input power $P_{IN}$ of the forward converter 640 in response to the magnitude of the sense current $I_{SENSE}$ (e.g., as determined from the first feedback signal $V_{FB1}$) and the magnitude of the bus voltage $V_{BUS}$ (e.g., as determined from the bus voltage feedback signal $V_{BUS-FB}$) (e.g., $P_{IN}=V_{BUS} \cdot I_{SENSE}$).

The control circuit 650 may be configured to detect an overload condition based on the first feedback signal $V_{FB1}$. For example, the control circuit 650 may be configured to determine the magnitude of the sense current $I_{SENSE}$ based on the feedback signal $V_{FB1}$, and configured to determine the magnitude the input power $P_{IN}$ of the forward converter 640 based on the magnitude of the sense current $I_{SENSE}$ and the magnitude of the bus voltage $V_{BUS}$ (e.g., as determined from the bus voltage feedback signal $V_{BUS-FB}$) (e.g., $P_{IN}=V_{BUS} \cdot I_{SENSE}$). The control circuit may compare the magnitude the input power $P_{IN}$ with a threshold, such as the power-limit threshold $P_{TH-PL}$, and control the magnitude of the load voltage $V_{LOAD}$ to approximately zero volts in response to detecting an overload condition (e.g., when the magnitude of the input power $P_{IN}$ exceeds the power-limit threshold $P_{TH-PL}$). Accordingly, in such examples, the control circuit 650 and the over-power protection circuit 690 may be configured to shut down the driver (e.g., de-energize the LED driver 600 and/or cause the magnitude of the load voltage $V_{LOAD}$ to be approximately zero volts) when the magnitude of the input power $P_{IN}$ is greater than a threshold, such as the power-limit threshold $P_{TH-PL}$ (e.g., greater than the UL defined power limit of the power supply). Alternatively or additionally, the control circuit 650 may compare the magnitude of the input current $I_{IN}$ to a threshold (e.g., an over-current threshold) to determine over-power condition (e.g., since the magnitude of the bus voltage $V_{BUS}$ may be maintained substantially constant), and/or the control circuit may calculate the magnitude of the input power $P_{IN}$ using the magnitude of the input current $I_{IN}$ and the magnitude of the bus voltage $V_{BUS}$ and compare the magnitude of the input power $P_{IN}$ to a threshold (e.g., an input-power threshold) to determine over-power condition.

The threshold used by the control circuit 650 when detecting an overload condition may be, but does not necessarily have to be, the same as the threshold used by the over-power protection circuit 690 (e.g., power-limit threshold $P_{TH-PL}$). For instance, in some examples, the threshold used by the control circuit 650 may be set to be slightly lower than the power-limit threshold $P_{TH-PL}$ used by the over-power protection circuit 690 (e.g., 95 watts as opposed to 96 watts used as the power-limit threshold $P_{TH-PL}$). Accordingly, in such examples, the control circuit 650 may cause the LED driver 600 to shut down before the over-power protection circuit 690.

The power supply 600 may also include an error-generation circuit 660. In some examples, the error-generation circuit 660 may be part of the control circuit 650. The error-generation circuit 160 may receive a second feedback signal $V_{FB2}$ from the forward converter 640 and a target voltage $V_{TRGT}$ from the control circuit 650. The second feedback signal $V_{FB2}$ may be indicative of the magnitude of the load voltage $V_{LOAD}$ of the LED driver 600. For example, the error-generation circuit 660 may be coupled across the load voltage $V_{LOAD}$. In some instances, the error-generation circuit 660 may comprise an optocoupler, where an emitter (e.g., photoemitter) of the optocoupler is located within the forward converter 640 on a secondary side of a transformer and a receiver (e.g., photosensor) of the optocoupler is configured to generate the second feedback signal $V_{FB2}$. Further, in some examples, the error-generation circuit 660 may be located within the forward converter 640, and the output of the error-generation circuit 660 (e.g., the error signal $V_{ER}$) may be provided to an emitter of the optocoupler that is located on the secondary side of the transformer, and then the receiver of the optocoupler is configured to receive the error signal $V_{ER}$ from the emitter and provide the error signal $V_{ER}$ to the control circuit 650. In some examples, the error-generation circuit 660 may comprise an integrating amplifier circuit, such as a proportional integral (PI) controller. For instance, in some examples, the error-generation circuit 660 may comprise a proportional-integral-derivative (PID) controller, and the error signal $V_{ER}$ may be indicative of the integration/accumulation of difference between the target voltage $V_{TRGT}$ and the output voltage $V_{OUT}$ over time.

The error-generation circuit 660 may receive the target voltage $V_{TRGT}$ from the control circuit 650. The magnitude of the target voltage $V_{TRGT}$ may indicate a target load voltage $V_{LOAD\text{-}TRGT}$ of the LED driver 600, for example, when the LED driver 600 is a constant-voltage power supply. Accordingly, the target load voltage $V_{LOAD\text{-}TRGT}$ may indicate a desired magnitude of the load voltage $V_{LOAD}$ (e.g., the magnitude of the constant-voltage that the LED driver 600 is configured to generate). In examples where the LED driver 600 is a constant-current power supply, the error-generation circuit 660 may receive a target current $V_{I\text{-}TRGT}$ may indicate a target load voltage $V_{LOAD\text{-}I\text{-}TRGT}$ of the LED driver 600, for example.

The error-generation circuit 660 may generate an error signal $V_{ER}$ and provide the error signal $V_{ER}$ to the control circuit 650. The error-generation circuit 660 may be configured to generate the error signal $V_{ER}$ based on the second feedback signal $V_{FB2}$ and target voltage $V_{TRGT}$. The error signal $V_{ER}$ may be indicative of the magnitude of a requested input power $P_{RQST}$ of the LED driver 600. For example, the requested input power $P_{RQST}$ may represent the amount of power that needs to be drawn from the bus voltage $V_{BUS}$ to generate the load voltage $V_{LOAD}$ at the load current $I_{LOAD}$. The requested input power $P_{RQST}$ may represent an amount of power to which the sense current $I_{SENSE}$ of the forward converter 640 may be adjusted as the control circuit 650 controls the forward converter 640 to generate the load voltage $V_{LOAD}$ at the load current $I_{LOAD}$. Further, the error signal $V_{ER}$ may be indicative of the difference between the actual load voltage $V_{LOAD}$ (e.g., based on the second feedback signal $V_{FB2}$) and a target load voltage $V_{TRGT\text{-}LOAD}$. The target load voltage $V_{TRGT\text{-}LOAD}$ may indicate the desired magnitude of the load voltage $V_{LOAD}$, which may be based on the constant-voltage rating of the LED driver 600. In some examples, the error-generation circuit 660 may comprise a proportional-integral-derivative (PID) controller, and the error signal $V_{ER}$ may be indicative of the integration/accumulation of difference between the target voltage $V_{TRGT}$ and the output voltage $V_{OUT}$ over time.

The control circuit 650 may regulate the load voltage $V_{LOAD}$ based on the error signal $V_{ER}$. For example, the control circuit 650 may perform closed-loop gate drive control based on the error signal $V_{ER}$. The control circuit 650 may control the magnitude of the load current $I_{LOAD}$, the magnitude of the load voltage $V_{LOAD}$, and/or the output power $P_{OUT}$ based on the error signal $V_{ER}$. For instance, the control circuit 650 may control the drive signals $V_{DR}$ provided to the gate drive circuit 614 to adjust the magnitude of the load voltage $V_{LOAD}$ to the target load voltage $V_{LOAD\text{-}TRGT}$ based on the error signal $V_{ER}$. Alternatively or additionally, the control circuit 650 may control the drive signals $V_{DR}$ provided to the gate drive circuit 614 to adjust the magnitude of the load current $I_{LOAD}$ to the target load current $I_{TRGT}$ based on the error signal $V_{ER}$. Further, and for example, when operating as a constant-voltage power supply, the control circuit 650 may adjust the operation of the forward converter 640 (e.g., adjust the operating frequency fop and/or a duty cycle $DC_{INV}$ (e.g., an on-time $T_{ON}$) of the drive signals $V_{DR}$) to maintain the load voltage $V_{LOAD}$ at the constant magnitude in response to the error signal $V_{ER}$. Examples of load control devices with closed-loop gate drive control include U.S. Pat. No. 5,041,763, issued Aug. 20, 1991, U.S. Pat. No. 8,466,628, issued Jun. 18, 2013, and U.S. Pat. Pub. No. US 2020/0366188, published Nov. 19, 2020, all of which are incorporated herein by reference.

Further, the control circuit 650 may also use the error signal $V_{ER}$ (e.g., and/or the second feedback signal $V_{FB2}$) to detect (e.g., infer) a fault condition in the LED driver 600. The control circuit 650 may detect a fault condition in the LED driver 600, such as a fault in one or more of the components of the LED driver 600 (e.g., a component fault), based on the error signal $V_{ER}$. For instance, the control circuit 650 may determine that the error signal $V_{ER}$ indicates that the requested input power $P_{RQST}$ is greater than a requested-power threshold $P_{TH\text{-}RQST}$ (e.g., indicating that the LED light source 602 is drawing current), but the first feedback signal $V_{FB1}$ indicates that the input power $P_{IN}$ is less than a threshold, such as a low power threshold $P_{TH\text{-}LO}$ (e.g., indicating that the LED driver 600 is not providing output power $P_{OUT}$). Stated another way, the control circuit 650 may be configured to detect that the LED driver 600 is attempting to deliver power (e.g., based on the requested power $P_{RQST}$) even though the input power $P_{IN}$ of the forward converter 640 appears to be low (e.g., approximately zero watts), for example, based on the first feedback signal $V_{FB1}$. In response, the control circuit 650 may determine (e.g., infer) that there might be a fault within one of the components of the LED driver 600 (e.g., within the forward converter 640 and/or the over-power protection circuit 690) and/or the control circuit 650 may cause the magnitude of the load voltage $V_{LOAD}$ to be reduced to approximately zero volts. Accordingly, the control circuit 650 may perform closed-loop gate drive control and detect a component fault in the LED driver 600 based on the error signal $V_{ER}$.

As noted above, the control circuit 650 may be configured to compare the magnitude of the input power $P_{IN}$ (e.g., as described based on the first feedback signal $V_{FB1}$) to the low power threshold $P_{TH\text{-}LO}$. The low power threshold $P_{TH\text{-}LO}$ may be less than the power-limit threshold $P_{TH\text{-}PL}$. In some examples, the low power threshold $P_{TH\text{-}LO}$ may be approximately 10 watts. The low power threshold $P_{TH\text{-}LO}$ may be set such that the magnitude of the input power $P_{IN}$ is greater than the low power threshold $P_{TH\text{-}LO}$ when the LED driver 600 is providing output power $P_{OUT}$ during normal operation, and such that the magnitude of the input power $P_{IN}$ is less than the low power threshold $P_{TH\text{-}LO}$ when the LED driver 600 is not providing output power $P_{OUT}$ during normal operation.

The control circuit 650 may compare the magnitude of the requested input power $P_{RQST}$ (e.g., indicated by the error signal $V_{ER}$) to the requested-power threshold $P_{TH\text{-}RQST}$. The requested-power threshold $P_{TH\text{-}RQST}$ may be determined such that the magnitude of the requested input power $P_{RQST}$ indicated by the error signal $V_{ER}$ exceeds the requested-power threshold $P_{TH\text{-}RQST}$ whenever the LED driver 600 is providing output power $P_{OUT}$ to the LED light source 602 during normal operation, and that the magnitude of the requested input power $P_{RQST}$ indicated by the error signal $V_{ER}$ is less than the requested-power threshold $P_{TH\text{-}RQST}$ whenever the LED driver 600 is not providing output power $P_{OUT}$ to the LED light source 602 during normal operation. If the LED light source 602 is drawing current from the LED driver 600, the difference between the actual load voltage $V_{LOAD}$ (e.g., based on the second feedback signal $V_{FB2}$) and a target magnitude $V_{TRGT}$ of the output voltage $V_{OUT}$ may exceed a threshold (e.g., the requested-power threshold $P_{TH\text{-}RQST}$). If the LED light source 602 is not drawing current from the LED driver 600, the difference between the actual load voltage $V_{LOAD}$ (e.g., based on the second feedback signal $V_{FB2}$) and the target magnitude $V_{TRGT}$ of the output voltage $V_{OUT}$ may be less than the threshold (e.g., the requested-power threshold $P_{TH-RQST}$).

When the LED driver 600 is operating properly and supplying current to the electrical load, such as when the magnitude of the input power $P_{IN}$ is greater than the low power threshold $P_{TH-LO}$ but less than the power-limit threshold $P_{TH-PL}$, and the magnitude of the requested input power $P_{RQST}$ indicated by the error signal $V_{ER}$ is greater than the requested-power threshold $P_{TH-RQST}$, the control circuit 650 may be configured to control the forward converter 640 to regulate the magnitude of the load voltage $V_{LOAD}$ towards the target magnitude $V_{OUT-TRGT}$ at the output terminals 196a, 196b of the LED driver 600.

However, the control circuit 650 may be able to perform fault protection (e.g., shut down the LED driver 600, for example, by causing the magnitude of the load voltage $V_{LOAD}$ to be reduced to approximately zero volts) when the magnitude of the input power $P_{IN}$ is less than the low power threshold $P_{TH-LO}$ and the magnitude of the requested input power $P_{RQST}$ indicated by the error signal $V_{ER}$ is greater than the requested-power threshold $P_{TH-RQST}$. As noted above, the low power threshold $P_{TH-LO}$ is configured such that the magnitude of the input power $P_{IN}$ should be less than the low power threshold $P_{TH-LO}$ when the LED driver 600 is not providing output power $P_{OUT}$ during normal operation. Further, the requested-power threshold $P_{TH-RQST}$ is configured such that the magnitude of the requested input power $P_{RQST}$ is greater than the requested-power threshold $P_{TH-RQST}$ when the LED driver 600 is providing output power $P_{OUT}$ to the LED light source 602 during normal operation. So, if the control circuit 650 determines that the magnitude of the input power $P_{IN}$ is less than the low power threshold $P_{TH-LO}$, but that the magnitude of the requested input power $P_{RQST}$ is greater than the requested-power threshold $P_{TH-RQST}$, the control circuit 650 may determine (e.g., infer) that one or more components of the LED driver 600 are faulted. Stated another way, the first feedback signal $V_{FB1}$ may indicate that the LED driver 600 is not providing power, but the error signal $V_{ER}$ may indicate that the LED driver 600 is providing power. This can occur when one or more components of the forward converter 640 and/or the over-power protection circuit 110 are faulted (e.g., open or shorted closed), such as a sense resistor $R_{SENSE}$ of the forward converter 640. In response to a determination that one or more components of the LED driver 600 are faulted, the control circuit 650 may be perform fault protection (e.g., shut down the LED driver 600, for example, by causing the magnitude of the load voltage $V_{LOAD}$ to be reduced to approximately zero volts).

Therefore, in the event that the first feedback signal $V_{FB1}$ is inaccurate (e.g., because the sense resistor $R_{SENSE}$ of the forward converter 640 is faulted) and the over-power protection circuit 690 and the control circuit 650 were to fail to recognize and trip in an overload condition, the control circuit 650 would still be able to detect a fault condition (e.g., due to an internal component failing) and shut down the LED driver 600 (e.g., control the magnitude of the load voltage $V_{LOAD}$ to approximately zero volts). Accordingly, the LED driver 600 may have redundant protection—meaning that if any single component in the LED driver 600 were to fail (e.g., a component of any of the over-power protection circuit 690, the control circuit 650, the sense resistor $R_{SENSE}$, etc.), the LED driver 600 would still be protected from the overload condition (e.g., since the control circuit 650 could detect this failure and cause the LED driver 600 to shut down).

The control circuit 650 may be coupled to the memory (not shown). The memory may store one or more thresholds and/or operational characteristics of the LED driver 600 (e.g., the target intensity $L_{TRGT}$, the low-end intensity $L_{LE}$, the high-end intensity $L_{HE}$, the first, second, and/or third thresholds, computer executable instructions for performing the procedures described herein, etc.). The memory may be implemented as an external integrated circuit (IC) or as an internal circuit of the control circuit 650. The memory may comprise a computer-readable storage media or machine-readable storage media that maintains computer-executable instructions for performing one or more procedure and/or functions as described herein. For example, the memory may comprise computer-executable instructions or machine-readable instructions that when executed by the control circuit configure the control circuit to provide one or more portions of the procedures described herein. The control circuit 650 may access the instructions from memory for being executed to cause the control circuit 650 to operate as described herein, or to operate one or more other devices as described herein. The memory may comprise computer-executable instructions for executing configuration software. For example, the one or more thresholds and/or operational characteristics stored in the memory may be configured during a configuration procedure of the LED driver 600.

The LED driver 600 may include a communication circuit (not shown), which may enable communication via, for example, a wired communication link or a wireless communication link, such as a radio-frequency (RF) communication link or an infrared (IR) communication link. The control circuit 650 may be configured to communicate (e.g., transmit and/or receive) communication signals, e.g., wired communication signals and/or wireless communication signals, such as RF signals, via the communication circuit. The communication circuit may comprise, for example, an RF transceiver, an RF receiver, an RF transmitter, an infrared (IR) receiver, and/or other suitable wireless communication circuit. The control circuit 650 may be configured to communicate messages (e.g., digital messages) with external devices via the communication circuit. In addition, the control circuit 650 may be configured to update the thresholds and/or the operational characteristics stored in the memory in response to messages (e.g., digital messages) received via the communication circuit.

Although described with reference to a power supply for an electrical load, and sometimes more specifically to an LED driver, one or more embodiments described herein may be used with other electrical loads and/or load control devices. For example, one or more of the embodiments described herein may be performed by a variety of load control devices that are configured to control of a variety of electrical load types, such as, for example, a LED driver for driving an LED light source (e.g., an LED light engine); a screw-in luminaire including a dimmer circuit and an incandescent or halogen lamp; a screw-in luminaire including a ballast and a compact fluorescent lamp; a screw-in luminaire including an LED driver and an LED light source; a dimming circuit for controlling the intensity of an incandescent lamp, a halogen lamp, an electronic low-voltage lighting load, a magnetic low-voltage lighting load, or another type of lighting load; an electronic switch, controllable circuit breaker, or other switching device for turning electrical loads or appliances on and off; a plug-in load control device, controllable electrical receptacle, or controllable power strip for controlling one or more plug-in electrical loads (e.g., coffee pots, space heaters, other home appliances, and the like); a motor control unit for controlling a motor load (e.g., a ceiling fan or an exhaust fan); a drive unit for controlling a motorized window treatment or a projection screen; motorized interior or exterior shutters; a thermostat for a heating and/or cooling system; a temperature control device for controlling a heating, ventilation, and air conditioning (HVAC) system; an air conditioner; a compressor; an electric baseboard heater controller; a controllable damper; a humidity control unit; a dehumidifier; a water heater; a pool pump; a refrigerator; a freezer; a television or computer monitor; a power supply; an audio system or amplifier; a generator; an electric charger, such as an electric vehicle charger; and an alternative energy controller (e.g., a solar, wind, or thermal energy controller). A single control circuit may be coupled to and/or adapted to control multiple types of electrical loads in a load control system.

What is claimed is:

1. A power supply for controlling an amount of power delivered by the power supply, the power supply comprising:
  a power converter circuit configured to control a magnitude of an output voltage, and configured to generate a first feedback signal indicative of a magnitude of an input current of the power converter circuit and a second feedback signal indicative of the magnitude of the output voltage;
  an over-power protection circuit configured to receive the first feedback signal indicative of the magnitude of the input current of the power converter circuit, and control the magnitude of the output voltage to be approximately zero volts in response to the magnitude of the input current exceeding a first threshold indicative of an over-power condition; and
  a control circuit configured to:
    determine a magnitude of a requested input power of the power supply based on the second feedback signal indicative of the magnitude of the output voltage; and
    control the magnitude of the output voltage to be approximately zero volts when the magnitude of the requested input power of the power supply is greater than a second threshold and the magnitude of the input current is less than a third threshold.

2. The power supply of claim 1, wherein the control circuit is further configured to control one or more drive signals provided to a gate drive circuit to adjust the magnitude of an output current or the output voltage based on the second feedback signal indicative of the magnitude of the output voltage.

3. The power supply of claim 1, further comprising:
  an error-generation circuit external to the control circuit, the error-generation circuit configured receive the second feedback signal indicative of the magnitude of the output voltage from the power converter circuit and a target voltage indicative of a desired magnitude of the output voltage, the error-generation circuit configured to generate a signal indicative of the magnitude of the requested input power in response to the target voltage and the second feedback signal;
  wherein the control circuit is configured to receive the signal indicative of the magnitude of the requested input power from the error-generation circuit, and configured to determine the magnitude of the requested input power of the power supply based on the signal indicative of the magnitude of the requested input power.

4. The power supply of claim 3, wherein the control circuit is configured to control the power converter circuit to adjust the magnitude of the output voltage towards the desired magnitude in response to the signal indicative of the magnitude of the requested input power.

5. The power supply of claim 3, wherein the control circuit is configured to:
  compare the magnitude of the input current to an input current threshold to detect an over-power condition; and
  control the magnitude of the output voltage to be approximately zero volts in response to the detection of the over-power condition.

6. The power supply of claim 3, wherein the control circuit is configured to:
  determine an input power of the power converter circuit based on the magnitude of the input current and the magnitude of input voltage of the power converter circuit;
  compare the magnitude of the input power of the power converter circuit to an input power threshold to detect an over-power condition; and
  control the magnitude of the output voltage to be approximately zero volts in response to the detection of the over-power condition.

7. The power supply of claim 1, wherein the control circuit is further configured to:
  receive the second feedback signal indicative of the magnitude of the output voltage from the power converter circuit; and
  determine the magnitude of the requested input power of the power supply from the second feedback signal.

8. The power supply of claim 7, wherein the control circuit comprises an error-generation circuit configured receive the second feedback signal indicative of the magnitude of the output voltage from the power converter circuit and generate a signal indicative of the magnitude of the requested input power; and
  wherein the control circuit is configured to determine the magnitude of the requested input power of the power supply based on the signal indicative of the magnitude of the requested input power.

9. The power supply of claim 1, wherein the control circuit is further configured to:
  compare the magnitude of the requested input power of the power supply to the second threshold; and
  compare the magnitude of the input current indicated by the first feedback signal to the third threshold.

10. The power supply of claim 1, wherein the control circuit is further configured to control the magnitude of the output voltage to be approximately zero volts when the first feedback signal is greater than a fourth threshold indicative of an over-current condition.

11. The power supply of claim 10, wherein the first threshold is greater than the fourth threshold.

12. The power supply of claim 1, wherein the control circuit is configured to operate in a normal operating mode when the magnitude of the input current indicated by the first feedback signal is greater than the third threshold but less than the first threshold, and the magnitude of the requested input power of the power supply is greater than the second threshold.

13. The power supply of claim 1, wherein the control circuit is configured to generate a drive signal to control the power converter circuit to adjust an average magnitude of the output voltage; and
  wherein the control circuit is configured to control the drive signal to adjust the magnitude of the output voltage to be approximately zero volts when the magnitude of the requested input power of the power supply is greater than the second threshold and the magnitude of input current indicated by the first feedback signal is less than the third threshold.

14. The power supply of claim 1, wherein the second threshold is determined such that the magnitude of the requested input power of the power supply is configured to exceed the second threshold when the power supply is supplying power during a normal operating mode.

15. The power supply of claim 14, wherein the second feedback signal indicative of the magnitude of the output voltage indicates an operating period of one or more switching circuits of the power converter circuit, and wherein the second threshold is an operating period threshold.

16. The power supply of claim 1, wherein the first threshold comprises a maximum power threshold, and the third threshold comprises a low-end power threshold that is less than the maximum power threshold.

17. The power supply of claim 1, wherein the power converter circuit comprises:
  a half-bridge inverter circuit comprising two switching circuits for generating an inverter voltage;
  a transformer comprising a primary side configured to receive the inverter voltage and a secondary side configured to provide the output voltage from the power supply; and
  an error generation circuit located on the secondary side of the transformer and coupled across the output voltage, wherein the error generation circuit is configured to generate the second feedback signal indicative of the magnitude of the output voltage.

18. The power supply of claim 1, wherein the power supply is configured to filter and amplify a sense signal to generate the first feedback signal.

19. The power supply of claim 18, further comprising:
  a sense resistor, wherein the input current is conducted through the sense resistor to generate the sense signal across the sense resistor.

20. The power supply of claim 1, further comprising:
  an AC-to-DC converter circuit configured to receive an alternating-current (AC) voltage and generate a DC voltage;
  wherein the control circuit is configured to provide a bus voltage control signal to the AC-to-DC converter circuit for adjusting a magnitude of the DC voltage, and receive a bus voltage feedback signal that indicates the magnitude of the DC voltage from the AC-to-DC converter circuit.

* * * * *